United States Patent [19]

Hirata et al.

[11] 4,447,837

[45] May 8, 1984

[54] VIDEO RECORDING SYSTEM

[75] Inventors: Noritsugu Hirata; Hiroyuki Takimoto; Masaya Maeda, all of Kanagawa, Japan

[73] Assignee: Canon Kabushiki Kaisha, Tokyo, Japan

[21] Appl. No.: 447,608

[22] Filed: Dec. 7, 1982

Related U.S. Application Data

[63] Continuation of Ser. No. 235,701, Feb. 18, 1981, abandoned.

[51] Int. Cl.³ .................... G11B 1/04; G11B 15/00; G11B 31/00; H04N 1/22
[52] U.S. Cl. ................................ 360/33.1; 358/335; 358/906; 358/908; 369/24; 369/69
[58] Field of Search ............... 358/210, 335, 906, 908; 360/5, 6, 33.1, 69; 369/19, 20, 24, 42, 69

[56] References Cited

U.S. PATENT DOCUMENTS

| | | | |
|---|---|---|---|
| 4,097,893 | 6/1978 | Camras | 358/906 |
| 4,163,256 | 7/1979 | Adcock | 358/906 |
| 4,262,301 | 4/1981 | Erlichman | 358/906 |

OTHER PUBLICATIONS

Broadcasting Systems & Operation, Jan. 1980, vol. 3, No. 1, pp. 11, 13, 14 & 16 "The Technical and Operational Aspects of Two New Broadcast Color Cameras", Hozettl.

*Primary Examiner*—George G. Stellar
*Attorney, Agent, or Firm*—Toren, McGeady and Stanger

[57] ABSTRACT

A video recording system includes a combination of a cassette type video recorder and a portable video camera, in which the recorder is provided with a battery for supplying power to both parts.

The camera has first and second switches which are so made that the switches are operated in sequence for controlling an operating condition of the recorder and camera. When the first switch is actuated, a shooting operation of the camera is started and the recorder is set into a stand-by state for recording. Then by an actuation of the second switch a recording operation of the recorder is started.

39 Claims, 23 Drawing Figures

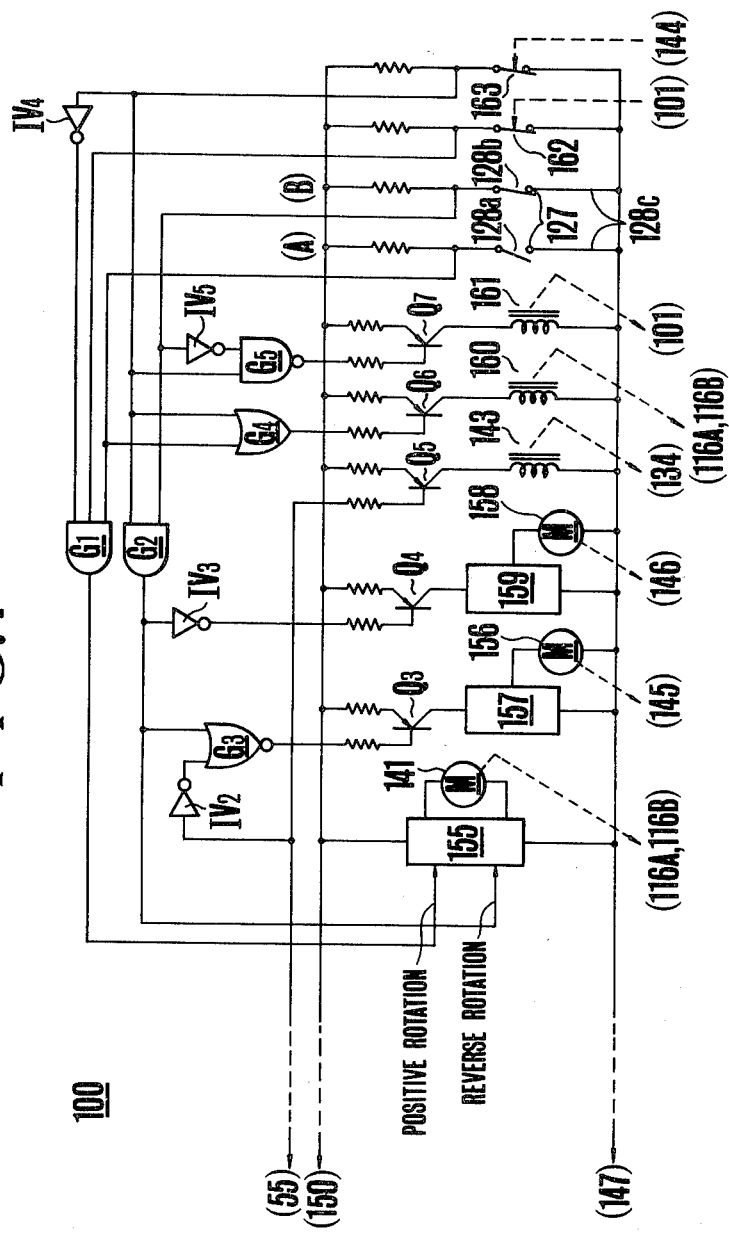

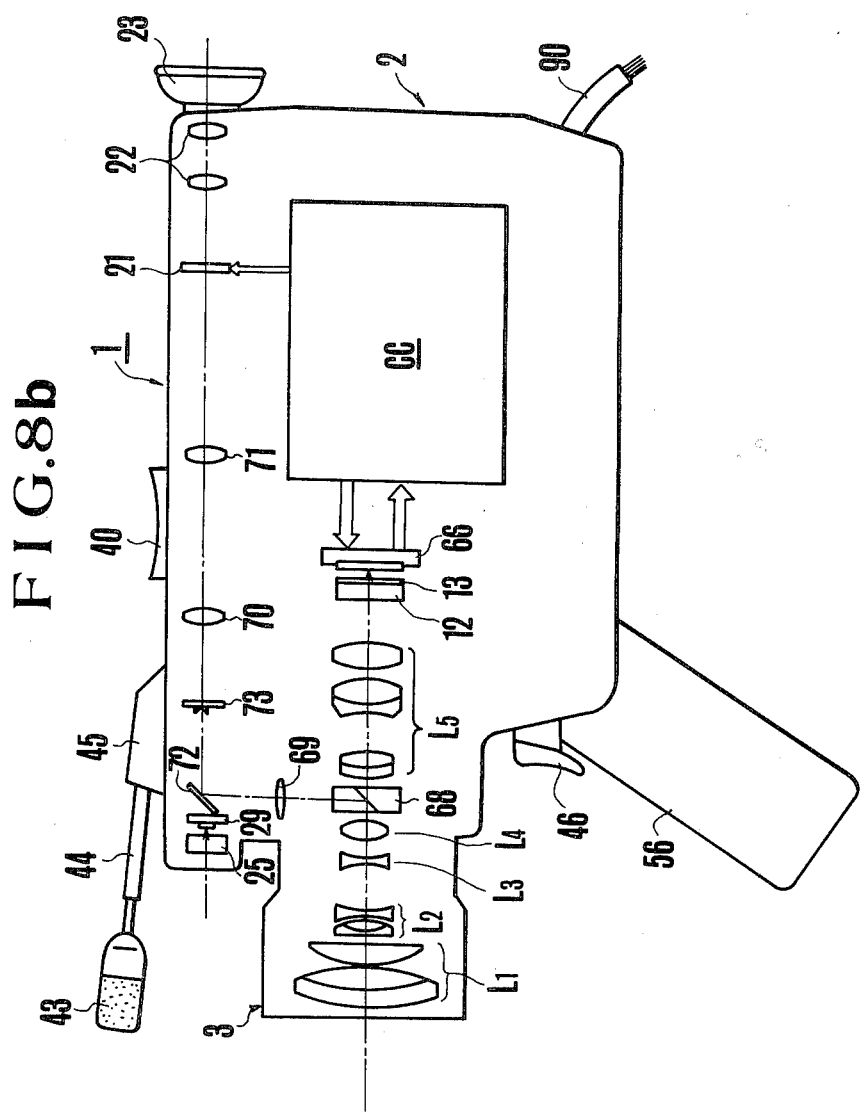

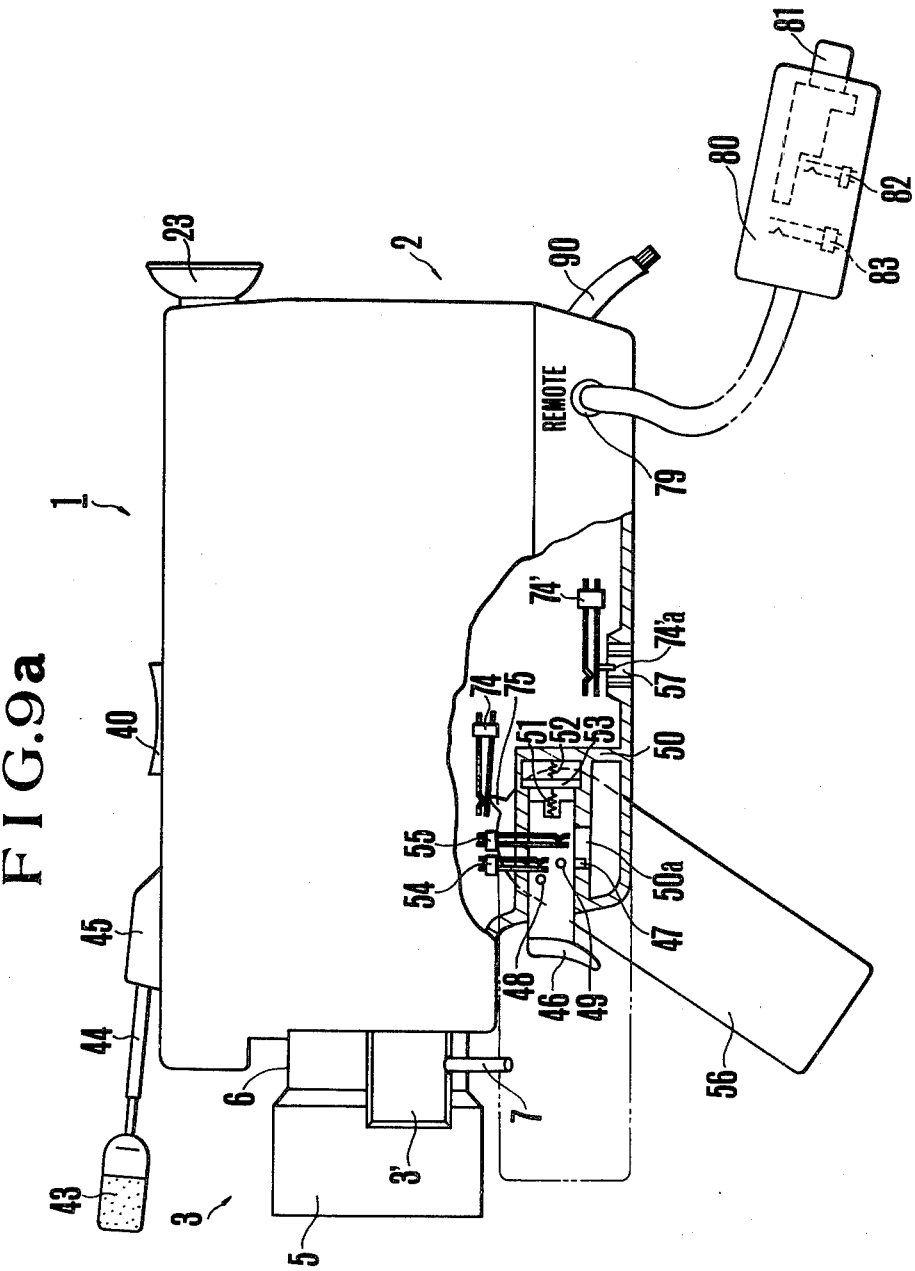

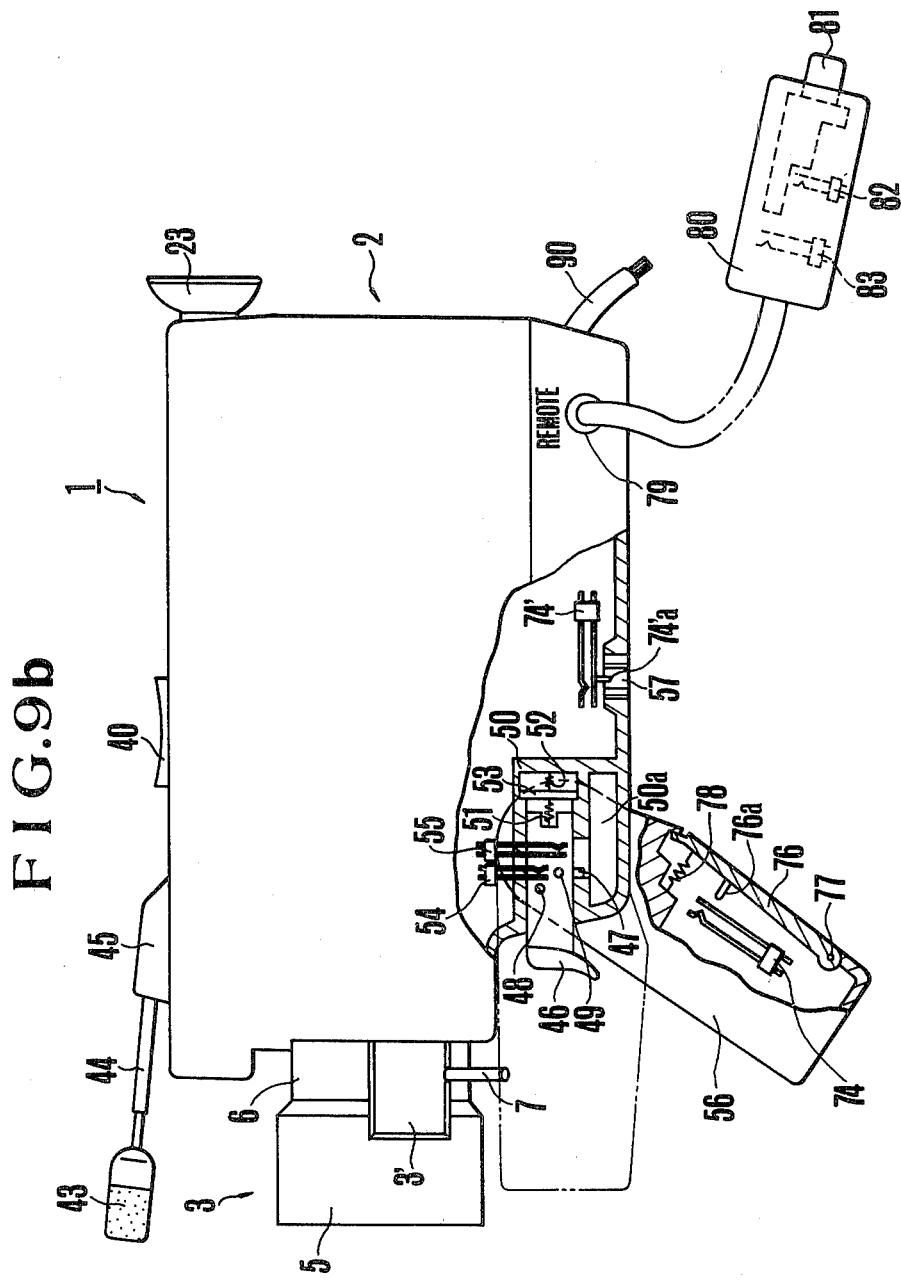

VIDEO RECORDING SYSTEM

BACKGROUND OF THE INVENTION

1. Field of the Invention

The present invention relates to a video recording system comprising a combination of a video camera and a video recorder.

2. Description of the Prior Art

A video camera is connected to a video recorder such as a video tape recorder, etc., and video signals provided from the camera side are recorded on a tape, etc., at the recorder side. A video recording system comprising a video camera and a video recorder is becoming increasingly popular.

Now, concerning a compact video recording system using a cassette type video tape recorder as a video recorder, especially a portable video recording system, most of the systems employ an arrangement such that when a camera is connected to a recorder for recording and a recording button at the recorder side is operated, all circuits in the camera receive power from a power source device provided at the recorder so as to start operation. However, at the recorder side, for example, a tape housed in a cassette is loaded into a signal recording system and the signal recording system is set into an operative state by operating the recording button while a tape running system is left in an inactive state. That is, for example, actuation of a motor for driving an image transcription head cylinder part and of a motor for driving a capstan, and the power supply to various circuit systems are done (here, in a set up in which a loading of a tape into a signal recording system has already been completed when the tape cassette is loaded into the recorder, only the setting of the signal recording system into an operative state is done by operating the recording button), thus the recorder is set in a state of stand-by for recording. Then, as a trigger button at the camera side is operated under said state, a trigger signal which is a recording start signal is given from the camera side to the recorder side, and thus a pressure contact of pinch rollers onto a capstan, etc., takes place at the recorder side, so that a running of the tape is started. Accordingly, video signals from the camera side will be recorded on the tape at the recorder side.

The main reason for employing an arrangement in this type of system such that a recorder is set in a re-cording-stand-by state, and a camera is set in an active state by operating a recording button at the recorder side, and then a trigger button at the camera side is operated to actuate the recorder to start recording, is that a camera usually employs an image pick up tube. As is well known, a comparatively long period of time is needed for an image pick up tube from the moment that a power supply to its heater circuit is started, until it reaches a normal operating state (in some cases something like ten seconds). Therefore, the recorder is set at a recording-stand-by state and a power supply to all circuit systems of the camera is started beforehand so that the camera is set in an operative state before recording.

This is surely a very advantageous system arrangement when using a video camera having an image pick up tube as image pick up means, but on the other hand such arrangement of the system has the following disadvantages. That is, first a loss of power. As mentioned above, in this system when a recording button is operated at the recorder side, the recorder is set in a recording-stand-by state, and the camera is set at an operative state, thus the total system is set at a recording-stand-up state. And, for example, in a portable system, etc., there are many cases wherein such a system is carried around while set in a recording-stand-by state so that a recording can be done immediately at any time, without missing a chance for recording which could take place unexpectedly. Therefore, power loss will be considerably great in such case, and especially in a portable system in which the power source capacity is limited, the life of the power source is shortened, thus causing great problems. Next, as a second disadvantage, there are problems of abrasion, damage of the magnetic plane of tape, or abrasion, etc., of a recording magnetic head at the recorder side. That is, when a recording button at the recorder side is operated in this kind of system, the recorder is set in a recording-stand-by state, and at this time, a rotating magnetic head for image transcription is rotating in contact with a tape loaded on the external circumference of a head cylinder. Yet, in general, various handlings are done at the camera side in image transcription, such as a determination of a composition, a zooming, a focusing, or an adjustment of a diaphragm aperture, etc., thus a long period of time is consumed until the camera is triggered on. Also triggering-off of the camera is frequently done. And when the camera is in a state of triggering-off, the tape is in a state being contacted against an image reproducing magnetic head which is in a rotating state at an image reproducing part. Therefore, such disadvantages are apt to happen as abrasion, damage of a magnetic plane of the tape or abrasion of the image reproducing magnetic head, etc.

Also, a third disadvantage is a problem in handling. That is, as has been explained above, at the time of recording in this kind of system, two completely independent operations, i.e, an operation of a recording button at the recorder side and an operation of a trigger button at the camera side are needed, and an image transcription cannot be done unless the recording button at the recorder side is already actuated. This constitutes a problem in the handling characteristics.

SUMMARY OF THE INVENTION

It is, accordingly, an object of the present invention to provide an improved video recording system which overcomes the disadvantages of prior art devices.

It is another object of the invention to provide a video recording system in which all the problems such as the unnecessary power loss, the abrasion of the tape and the video head, and the problem in handling characteristics are settled.

It is yet another object of the invention to provide a video recording system comprising a cassette type video recorder and a video camera which are connected by a cable, detachably combined or integrally formed in a unit, wherein said camera is provided with first and second switches which are operated in turn for controlling an operating condition of the recorder and the camera.

It is a further object of the invention to provide a video recording system wherein when said first switch is actuated the camera is made to start its shooting operation and the recorder is set into a stand-by state, and then as the second switch is actuated, the recorder is made to start its recording operation.

It is a further object of the invention to provide a video recording system wherein said camera is provided with a further switch which is to be operated prior to the operation of said first and second switches to set the camera into a stand-by state or a ready state for shooting, in order to reduce useless power loss in the camera side or portion.

BRIEF DESCRIPTION OF THE DRAWINGS

Other objects and many attendant advantages of the present invention will be readily appreciated as the same becomes better understood by reference to the following detailed description as reviewed in connection with the accompanying drawings, in which like reference characters designate the same or similar parts throughout the figures thereof and wherein:

FIGS. 3(a) and (b) are to show an operational relationship in the video recorder shown in FIG. 1, especially a tape loading mechanism and a tape running system, wherein FIG. 3(a) shows a state of a tape unloading while

FIG. 7 is a circuit connection diagram for important parts chiefly showing an arrangement of an important circuit system in a portion of a modified form of video recorder which can be applied to the system of said example.

FIGS. 9(a) and (b) are partially broken side elevations of two forms of a video camera which can be applied to another example of a video recording system according to the present invention, especially showing arrangements of important parts which are different from the arrangement of the video camera shown in FIG. 1 and FIG. 2.

DESCRIPTION OF THE PREFERRED EMBODIMENTS

Examples of the present invention shall be explained, referring to the attached drawings.

Figure 1:
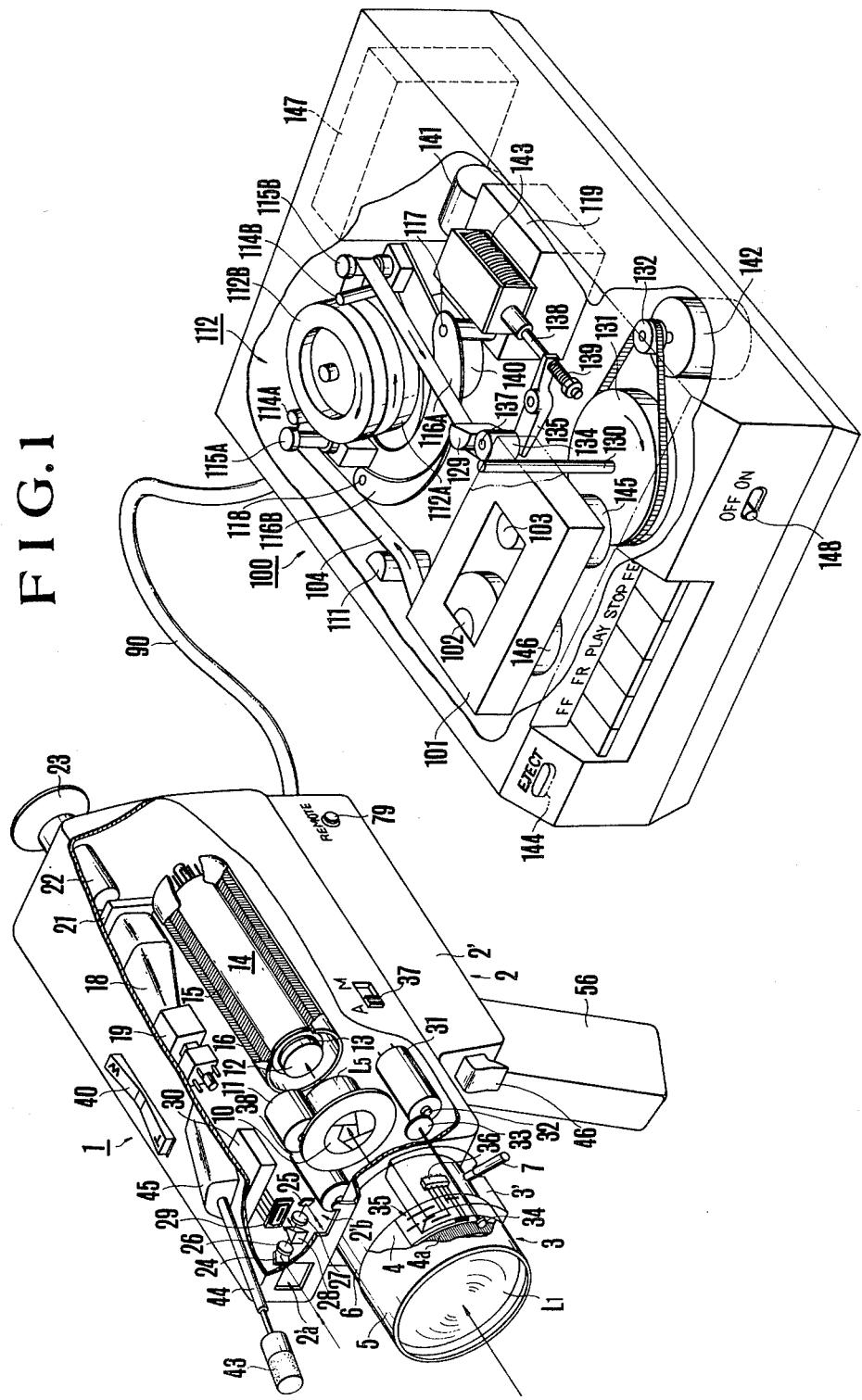
FIG. 1 is an oblique view of an arrangement of important parts of a video camera and a video recorder showing overall features of an example of a video recording system according to the present invention.

First, referring to FIG. 1, which shows a total feature of an example of a video recording system according to the present invention, a video camera 1 and a video recorder 100 are connected by a connecting cable 90, wherein power is supplied to the camera side 1 from a power source device provided at the recorder side 100 through the cable 90, so that recording control signals and video signals as well as audio signals, etc., are supplied from the camera side 1 to the recorder 100 side.

Figure 2:
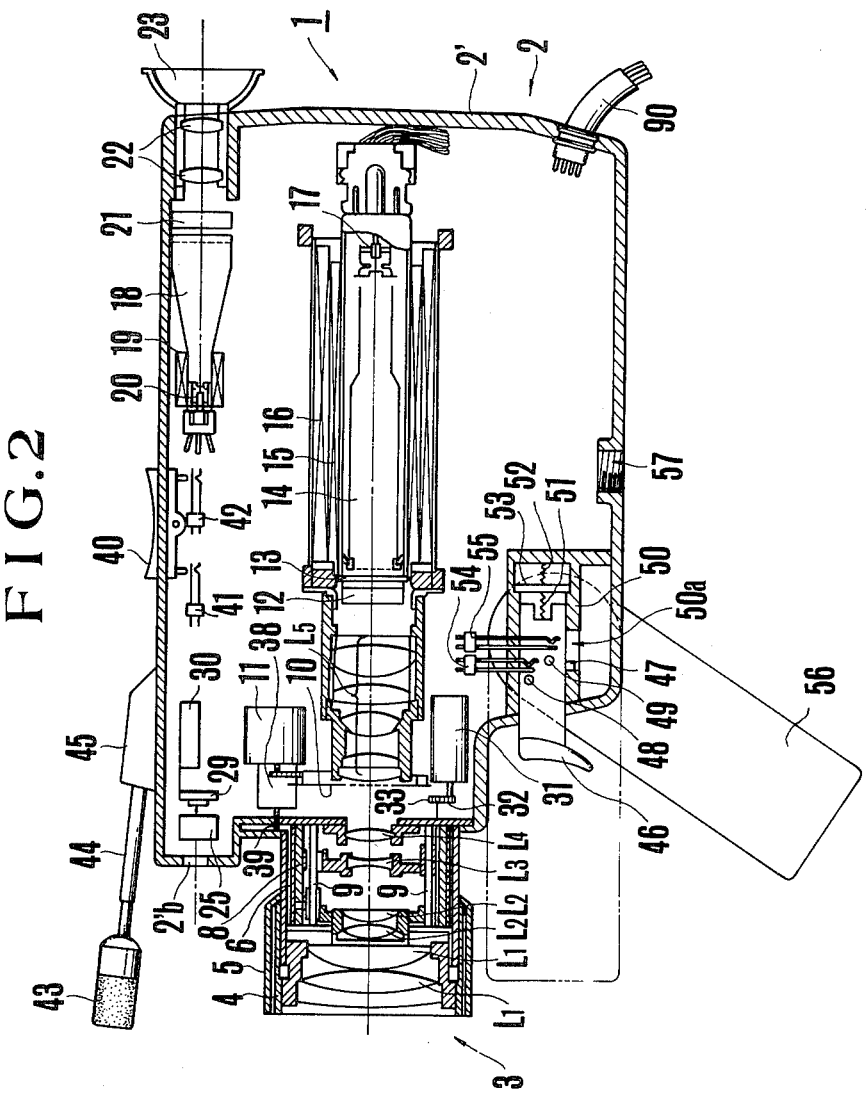
FIG. 2 is a partial sectional view to show an outline of an internal arrangement of the video camera shown in FIG. 1.

First, an arrangement of the video camera 1 will be explained. In FIGS. 1 and 2, a taking lens assembly 3 is provided at the camera main body 2, including a focusing lens L1, and a focusing ring 4 to advance and retreat the focusing lens L1 along an optical axis. An operating ring 5 for manual focusing is coupled to the focusing ring 4. L2 and L3 in FIG. 2 are a variator lens and a compensator lens which constitute an optical system. A cam ring 8 for zooming moves the variator lens L2 and the compensator lens L3 along a guide rod 9 under a prescribed relationship for zooming. A zooming ring 6 is coupled to the cam ring. An operating rod for manual zooming is supported at a part of the zooming ring 6. L4 is an afocal lens.

Next, in the camera main body 2, what is shown as numeral 10 is an iris diaphragm, and 11 is a motor for regulating the iris diaphragm 10. L5 is a relay lens. Numeral 12 is an optical low pass filter, 13 is a color stripe filter, 14 is an image pick up tube as image pick up means, and 15 is a focus coil for the tube 14. Numeral 16 is a deflection coil and 17 (in FIG. 2) is a heater. Numeral 18 is an image projection tube such as a CRT display tube, etc., as image monitoring tube, and 19 is a deflection coil of the tube 18 while 20 (in FIG. 2) is a heater. Numeral 21 is a display unit having display elements such as LED, etc., for making a warning display of low brightness and high brightness, displays of audio signal level and of the focusing state of a taking lens system (L1 to L5), as well as a tally display, etc., within a viewfinder. Numeral 22 is an eyepiece lens for a viewfinder and 23 is an eye cup. Numerals 24 and 25 are mirrors which are obliquely positioned facing range finding windows 2'a and 2'b formed with a prescribed separation in a base line at a front plane of a camera main body housing 2'. Numerals 26 and 27 are imaging lenses to form a detection image for range finding, receiving light from the mirrors 24 and 25, respectively. Numeral 28 is a reflective lens or prism to reflectively deflect imaging optical flux from each imaging lens 26 and 27, wherein an optical system for a so-called base line range finder is formed by these components, and a linear image sensor 29 such as CCD, is at a position to receive imaging optical flux from the prism 28 (a focus plane of the imaging lenses 26 and 27 to be exact). A range and focal point detection circuit 30 is formed as an IC chip here, which receives an image scanning output from the image sensor 29 for detecting the distance to an object, and at the same time to detect states of focus adjustment of the taking lens system (L1 to L5). That is, states of proper focusing, front focusing, and rear focusing, based on the distance detection result data at the time of said distance detection and positional data to show a position of the focusing lens L1 on an optical axis, as obtained by an arrangement to be described later. Numeral 31 is a motor for an automatic focus adjustment which is actuated for so regulating the focusing ring 4 that the taking lens system (L1 to L5) is focused to an object based on a focus control signal output from the range and focus detection circuit 30. And the driving power of the motor 31 is transmitted to a gear 34 which engages with a gear part 4a formed at a part of the focusing ring 4 through gears 32 and 33, hence the focusing ring 4 is rotated, and the focusing lens L1 is made to advance and retreat along an optical axis through a known type of a helicoid mechanism. Numeral 35 is a Gray code signal board consisting of a combination of patterns of a conductive part and of a non-conducting part for indicating a position of the focusing lens L1 on an optical axis by digital words of prescribed bit numbers, and said board 35 is attached on an external circumference of the focusing ring 4. A brush 36 is provided at a fixed position for brush contacting the Gray code signal board 35, wherein positional data showing the position of the focusing lens L1 on an optical axis can be obtained as a digital signal with a prescribed bit number through the brush 36, and this data is entered into the above-mentioned range and focus detection circuit 30.

Now, in FIG. 1, a cover member 3' for an automatic focus adjustment mechanism is attached to the lens assembly 3. Here, an automatic focus adjustment device is formed by said components. Also, said range and focus detection circuit 30 is so made that the relative positional relationship of two images formed by the above-mentioned optical system (24 to 28), based on an image scanning signal on the two images, allows the distance to an object to be detected, and digital distance data obtained at this time are compared with digital positional data on the position of the focusing lens L1 obtained through the brush 36, so that a focus adjusting state of the focusing lens L1 can be detected. As a concrete example of the above, a circuit arrangement such as disclosed in Japanese Patent Application Laid-Open No. Sho 55-11023, previously filed by the present application, can be used.

Numeral 37 is an operating knob for change over between auto- and manual focusing, and is provided at a side of the camera main body housing 2'. Numeral 38 is a zooming motor, and a gear 39 provided at an output shaft of said motor engages with a gear part formed at a part of the zooming ring 6. Therefore, as the zooming ring 6 is rotated by the motor 38 the cam ring 8 is rotated and, as a result, the variator lens L2 and the compensator lens L3 are moved in a well known manner for zooming. Numeral 40 is a rocker type operating button for auto zooming, and 41 and 42 are a tele-switch and a wide switch, respectively, which are actuated selectively by operating the button 40. Numeral 43 is a microphone, and 44 is a freely expandable and shrinkable rod thereof and 45 is a microphone holder. A camera trigger button 46 is held by a camera frame member 50 as shown in FIG. 2 and is slidable to left and right as a pin 47 of the button 46 engages with a slot 50a of the frame member 50, also being biased to a protruding position in the drawing by springs 51 and 52. Also in this case, the spring 52 has a stronger resisting power than that of the spring 51, and as shown in the drawing, spring 51 is provided between a tail end of the trigger button 46 and a pressing plate 53, while the spring 52 is provided between the pressing plate 53 and a bottom part of the frame member 50. Therefore, a pressing stroke on the trigger button 46 will be divided into a first pressing stroke, and a second pressing stroke which presents a second resisting power greater than that presented in the first pressing stroke. First and second trigger switches 54 and 55 are so provided that the first trigger switch 54 is made to be actuated at the first pressing stroke by a first switch operating pin 48 of the trigger button 46, and the second trigger switch is made to be actuated at the second pressing stroke by a second switch operating pin 49 of the trigger button 46. Numeral 56 is a grip which can be raised and flatted down between an operating position shown by a solid line in FIGS. 1 and 2 and an inoperative position shown by two dot-broken lines, and 57 is a screw hole for fixing a tripod.

Figure 3A:
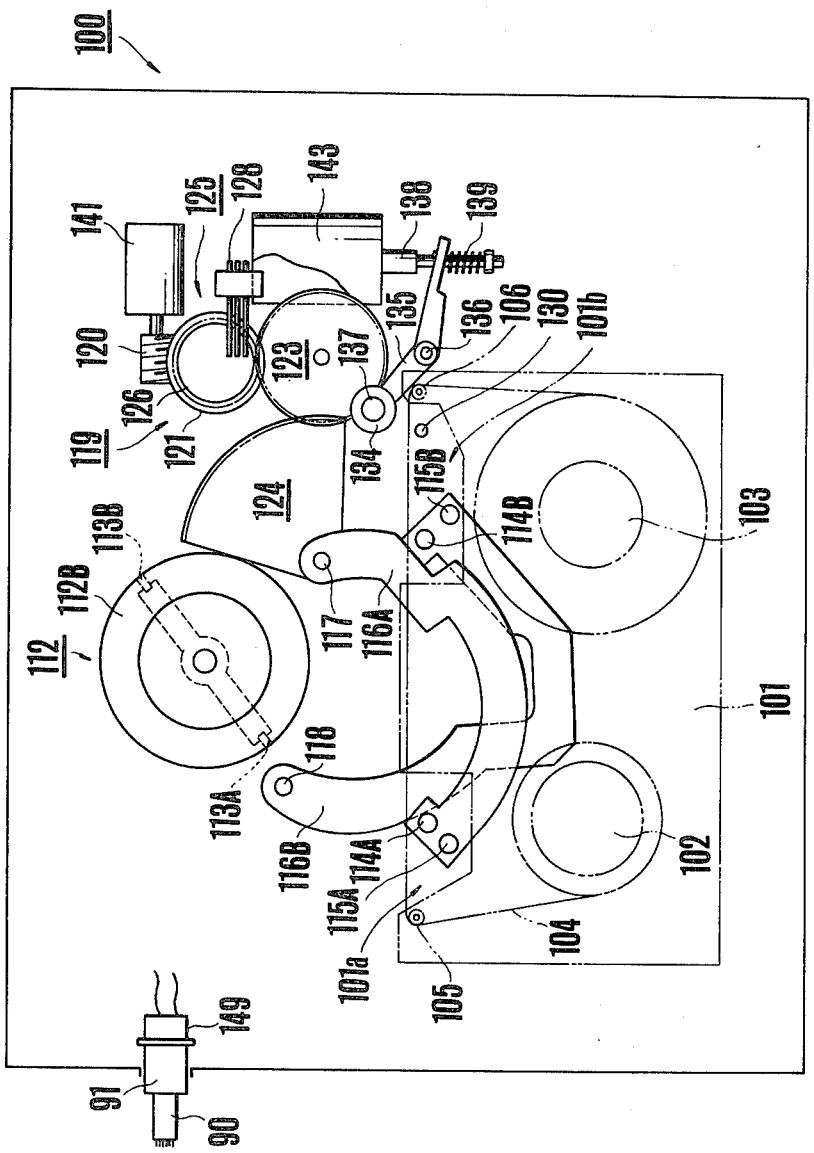

Next, explanations shall be made on an arrangement of the video recorder 100. In FIG. 1, said video recorder 100 is shown as a cassette type video recorder using a tape cassette, and a tape cassette 101 is loaded into the recorder 100, and what is shown as 102 is a core at the tape supply side of the cassette, while 103 is a core at the tape take up side. Numeral 104 is a video magnetic tape, and 111 is a total width erasing head. A head cylinder part 112 serves as an image reproduction part, and is made of a fixed lower cylinder 112A with its axis line being oblique against a chasis of a recorder main body, and an upper cylinder 112B which can rotate, wherein rotating magnetic heads 113A and 113B for image reproduction at diametrically opposed positions are provided at the upper cylinder 112B as shown in FIGS. 3(a) and (b) in such a manner that said heads protrude between the upper cylinder 112B and the lower cylinder 112A, and these heads are to be driven by a cylinder motor 140 together with the upper cylinder 112B. Also as is well known, a tape leading stepped part and a tape guide plane are formed at an external circumference of the lower cylinder 112A, and a tape guide plane is formed at an external circumference of the upper cylinder 111B, while the tape 104 is made to circumferentially contact the tape guide plane by a mechanism to be described later.

Figure 4:
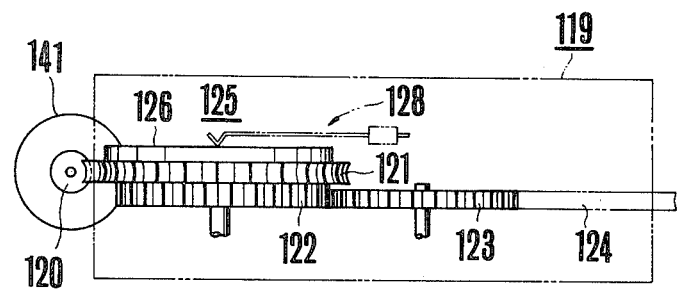
FIG. 4 is a side elevation to show an internal arrangement of a tape loading mechanism block at the video recorder shown in FIG. 1.

Slanted pins 114A, 114B and straightly erect tape guide posts 115A, 115B form tape loading means, wherein the slanted pin 114A and the guide post 115A are mounted on a forward end part of a loading arm 116A supported by a rotation shaft 117 at its tail end, and the slanted pin 114B and the guide post 115B are mounted on a forward end part of a loading arm 116B which is supported at its tail end by a rotating shaft 118. The loading arm 116B is in its associated relationship with the loading arm 116A by a suitable coupling mechanism although not shown in the drawing. The slanted pins 114A, 114B have an inclination corresponding to an inclination of axis lines of the cylinders 112A and 112B, and the tape 104 is wound on a gap part of the upper and lower cylinders 112A and 112B relatively in oblique manner for a range of 180 +α degree as shown in FIG. 1. Numeral 141 is a loading motor for driving a tape mechanism, and 119 is a tape loading mechanism block to rotate the loading arms 116A and 116B by the driving power of the motor 141, wherein said block 119 has, as shown in FIGS. 3(a) and (b) and FIG. 4, a worm wheel 121 engaged with an output worm gear 120 of the motor 141, a gear 122 being integral with the worm wheel 121, and an intermediate gear 123 engaged with the gear 122, as well as a sector gear 124, which engages with the intermediate gear 123 and is coupled with a shaft 117 of the loading arm 116A at its rotating center wherein when, for example, the motor 141 is rotated to its normal direction, the sector gear 124 is rotated to a clockwise direction and at this time, the loading arm 116A is also rotated to a clockwise direction, while the loading arm 116B is rotated to a counterclockwise direction. And as the motor 141 is rotated to a reverse direction, the sector gear 124 is rotated to a counterclockwise direction, and at this time, the loading arm 116A is also rotated to a counterclockwise direction, while the loading arm 116B is rotated to a clockwise direction.

Figure 5A:
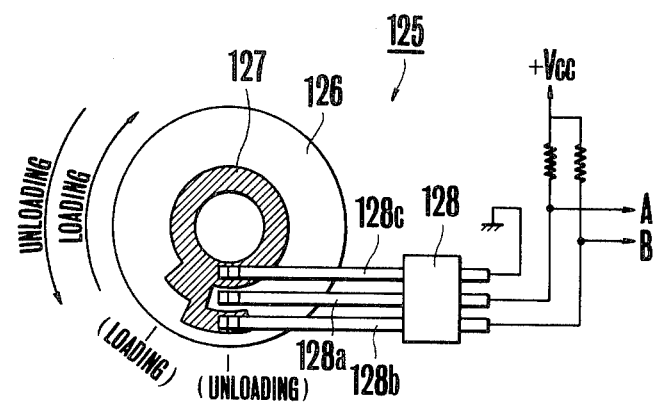
FIG. 5(a) is a plan to show details of position detection means in the tape loading mechanism block shown in FIG. 4.
Figure 5B:
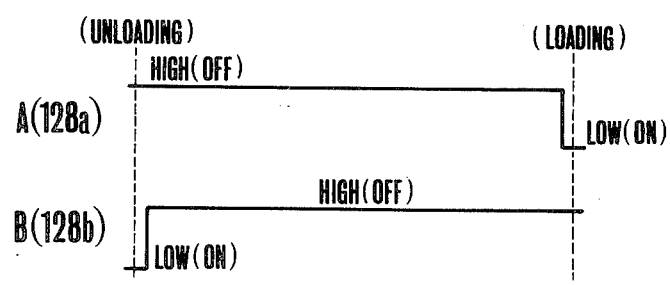
FIG. 5(b) is a drawing to show an output pattern of said position detection means.

Now, here, as will be understood from the above-mentioned arrangement, by the rotation of the loading arms 116A and 116B to a clockwise direction and a counterclockwise direction, the slanted pin 114A and the guide post 115A as well as the slanted pin 114B and the guide post 115B proceed from notches 101a and 101b of the loaded tape cassette shown in FIG. 3(a) into the cassette 101 and are shifted from their first positions between tape guide rollers 105 and 106 within said cassette 101 and at a reverse side of the tape 104 (hereinafter this will be called unloading positions), to their second positions which are placed a little in rear of centers of the cylinders 112A and 112B so that the tape 104 is pulled out of the cassette 101 and is made to go around about half the circumference (that is, the range of 180 +α degree) of the external circumference of the cylinders 112A and 112B (hereinafter this will be called loading positions), and are shifted from said loading positions to the unloading positions by the clockwise and counterclockwise rotations of the loading arms 116A and 116B. And in this example, when the slanted pin 114A and the guide post 115A, as well as the slanted pin 114B and the guide post 115B, are shifted from the unloading positions to the loading positions and from the loading positions to the unloading positions, the worm wheel 121 will make about one rotation (but less than one rotation) to a clockwise direction and to a counterclockwise direction, respectively. Also in FIGS. 3(a) and (b), and FIG. 4, what is shown as 125 position detection means for detecting shifted positions of the slanted pins 114A and 114B and the guide posts 115A and 115B. Said means 125 consists of a printed disc 126 which has conductive pattern 127 and is fixed at an upper plane of the worm wheel 121 and, as shown in FIG. 5(a), a detection brush 128 which has three conductive contacting pieces 128a, 128b and 128c placed in a manner shown in the same drawing against the printed disc 126, wherein of the three conductive contacting pieces 128a to 128c of the detection brush 128, the piece 128c is grounded by a grounding piece, while the pieces 128a and 128b are detection contacting pieces to which a voltage Vcc is given. And the conductive pattern 127 on the printed disc 126 are so formed that high and low signals as shown in FIG. 5(b) are generated at output terminals A and B of the detection contacting pieces 128a and 128b within the rotating range of the worm wheel 121 corresponding to the shiftings of the slanted pins 114A and 114B and the guide posts 115A and 115B between the unloading positions and the loading positions. Also, while not being shown in the drawings, the loading arms 116A and 116B are so made that they are latched at the loading positions of the slanted pin 114A and the guide post 115A, and of the slanted pin 114B and the guide post 115B, respectively, shown in FIG. 3(b), by releasable latching means of a suitable type for determining proper positions for the slanted pins 114A and 114B and the guide posts 115A and 115B at their loading positions. Numeral 129 is a reproduction magnetic head for audio signals and for control signals, and 130 is a capstan which proceeds into the tape cassette 101, as the cassette 101 is loaded, through the notch 101b, and is positioned at a reverse side of the tape 104 spanning between the guide rollers 105 and 106. And a fly wheel 131 is provided at the capstan 130, and said fly wheel 131 is made to be rotatingly driven through a belt stretching between an output pulley 132 of a capstan motor 142 and the wheel 131 itself. A pinch roller 134 is provided for pressure contacting the tape 104 between itself and the capstan 130 for tape running. The roller 134 is supported, in a freely rotatable manner, by a shaft 137 at a forward end of one arm of a pinch roller arm 135 which is axially supported in a rotatable manner by a shaft 136, while the other arm of the pinch roller arm 135 is, at its forward end, coupled to a coil spring 139 attached to a forward end of an armature rod 138 of a pinch roller pressure contacting solenoid 143. Numeral 145 (FIG. 1) represents driving means for taking up tape and 146 represents driving means for rewinding tape, both of which have tape core driving motors, respectively, and are so arranged that they will be coupled to a core 103 at a tape take up side, and a core 102 at a tape supply side, when the tape cassette 101 is loaded. Numeral 147 is a power source unit provided at the recorder 100, and 148 is an operating knob for a power source switch. Also what is known as 91 in FIG. 3(a) is a plug provided at a forward end of a cable 90 and what is shown as 149 is a connector at a recorder 100 side corresponding thereto.

Arrangements of electrical circuit systems for the video camera 1 and the video recorder 100 having mechanical arrangements as have been explained above will now be described, referring to FIG. 6.

Figure 6:
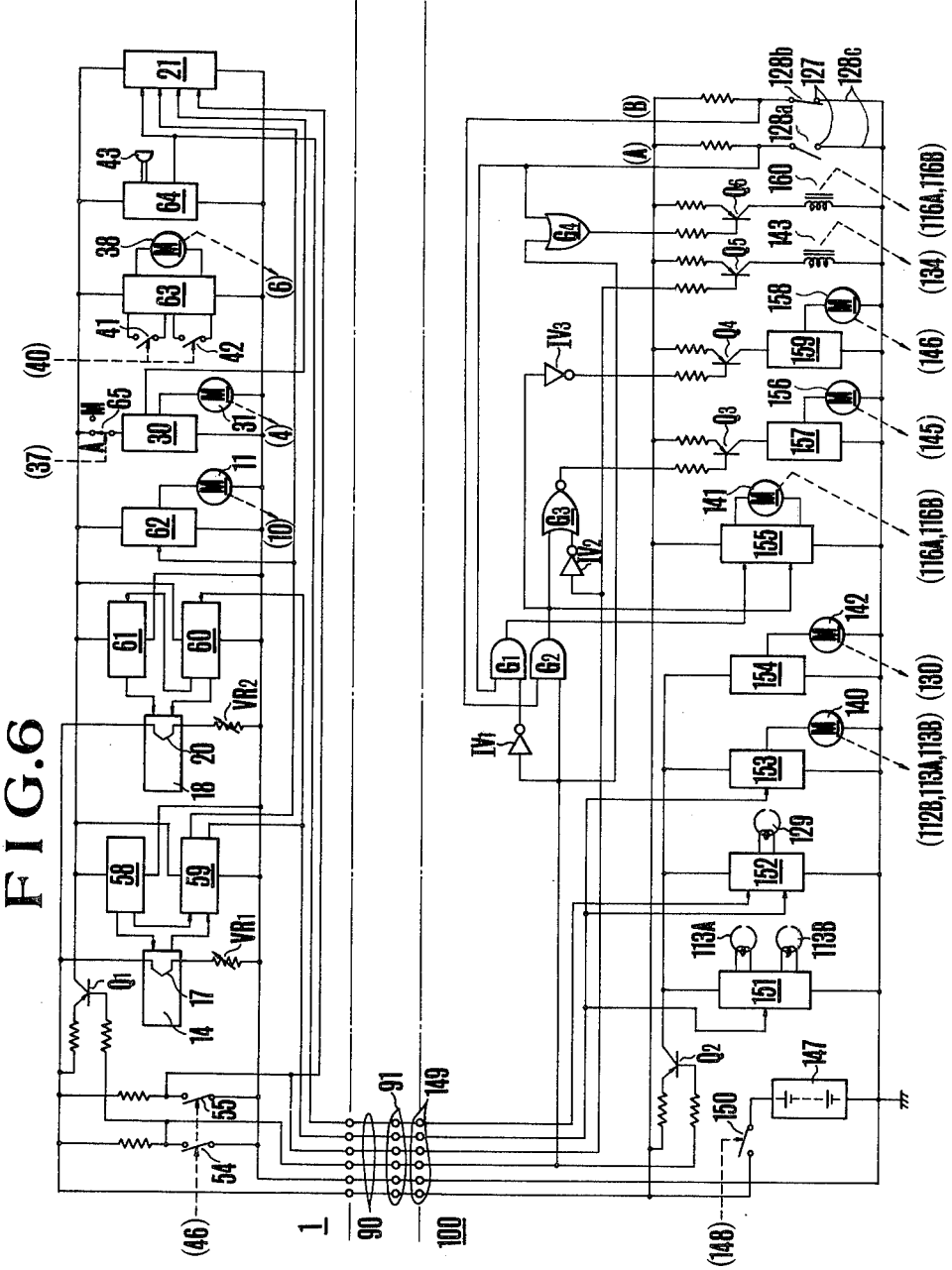
FIG. 6 is a circuit connection diagram of a video camera and a video recorder to show an arrangement of an electric circuit of the system of said example.

In FIG. 6, a connecting cable 90 is located in a central portion of the figure, and an upper half portion above the cable 90 shows electrical circuit systems at the camera side 1, while a lower half portion shows electrical circuit systems at the recorder side 100. In FIG. 6, an image pick up tube control circuit 58 contains a high voltage generation circuit as a deflection circuit, and a video process circuit 59 provides standard video signals based on image pick up signals from the image pick up tube 14 and synchronizing signal elements contained in deflection signals from the image pick up tube control circuit 58. A display circuit 60 provides image projection signals for display to the image projection tube 18 based on video signals from the video process circuit 59. An image projection tube control circuit 61 contains a deflection circuit and a high voltage generation circuit which is actuated based on synchronizing signals from the display circuit 60. A diaphragm control circuit 62 controls the iris diaphragm regulating motor 11 based on brightness signals from the video process circuit 59.

Numeral 30 is the above-mentioned range and focus detection circuit and a zooming control circuit 63 rotates the zooming motor 38 corresponding to activation of the zooming switches 41 and 42 in a direction prescribed by said switches. An audio amplifier 64 amplifies sound signals from the microphone 43, and the above-mentioned display unit 21 makes displays for low brightness, high brightness warnings, for audio signal level and for a state of focusing by the taking lens system (L1 to L5) and a talley display, etc. within a viewfinder, based on the level of brightness signals provided from the video process circuit 59, the level of the audio signals provided from the audio amplifier 64, signals provided from the range and focus detection circuit 30 for showing a state of focusing by the taking lens system (L1 to L5), and the low level signal obtained as the second trigger signal 55 is produced. And these components are connected as shown in the drawing in such a manner that they are activated as power is supplied thereto through the cable 90 from a power source unit 147 provided at the recorder side 100, as power is supplied to a pnp switching transistor Q1 for controlling power supply which is so arranged as to conduct as the trigger switch 54, which is coupled to the base of the transistor Q1, becomes low under the circumstance that a power source switch 150 is actuated by operating the operating knob 148 (FIG. 1). And on the other hand, the heater 17 of the image pick up tube 14 and the heater 20 of the image projection tube 18 will have power supplied thereto directly from the power source unit 147 through the connecting cable 90 as the power source switch 150 at the recorder side 100 is actuated. Also, VR1 and VR2 are signals and control signals based on the audio signals from variable resistances for regulating current to the heaters 17 and 20, respectively. Numeral 65 is a switch for change over for auto-focusing-manual-focusing, being changed over between a terminal A and a terminal M by operating the auto-focusing-manual-focusing change over switch 37 (FIG. 1) mentioned above, wherein the range and focus detection circuit 30 is made operable only when the switch 65 is changed over to "A" side (that is an auto-focusing mode).

Here, the display unit 21 is so arranged that it makes a talley display in response to low level signals obtained as the second trigger switch 55 is actuated by the second stage of a pressing stroke of the trigger button 46.

Next, arrangements of the electrical circuit systems at the recorder side 100 shall be explained. In the drawings, an image transcription circuit 151 gives recording video signals to the image transcription heads 113A and 113B based on the video signals from the video process circuit 59 at the camera side 1. A recording circuit 152 for audio signals and control signals gives recording audio signals and control signals to the recording and reproduction head 129 for audio signals and control signals based on the audio signals from the audio amplifier 64 and the synchronizing signal elements contained in the video signals from the video process circuit 59 at the camera side 1. A cylinder motor control circuit 153 controls the cylinder motor 140 based on the synchronizing signal elements contained in the video signals from the video process circuit 59. A capstan motor control circuit 154 controls the capstan motor 142. And these components are connected as shown in the drawing in such a manner that they are activated as power is supplied thereto from the power source unit 147 as a pnp switching transistor Q2 is conductive, wherein said transistor Q2 conducts as its base becomes low when the first trigger switch 54 is actuated under a circumstance that the power source switch 150 is actuated. A loading motor control circuit 155 controls the loading motor 141, and is so arranged that it rotates the loading motor 141 to its normal direction for effecting a tape loading, in response to an output of an inverter IV1 which inverts signals obtained corresponding to ON, OFF of the first trigger switch 54 at the camera side 1 (low signal in ON and high signal in OFF) under a circumstance that power is supplied as the power source switch 150 is actuated; and in response to high level signals of an AND gate G1 which receives signals obtained corresponding to ON, OFF of the conductive contacting piece 128a of the detection brush 128 at the above-mentioned position detection means (FIGS. 3(a), 3(b), FIG. 4 and FIG. 5) (that is, signal "A" in FIG. 5(b)). The loading motor control circuit 155 rotates the loading motor 141 to a reverse direction for effecting tape unloading in response to the high level output of an AND gate G2 which receives the signals corresponding to ON, OFF of the first trigger switch 54 and the signals obtained corresponding to ON, OFF of the conductive contacting piece 128b of the detection brush 128 at the position detection means 125 (that is, the signal "B" in FIG. 5(b). A tape take up motor 156 at the driving means 145 takes up the tape (FIG. 1), and a motor control circuit 157 controls the tape take up motor 156. Q3 is a pnp switching transistor for controlling power supply to the tape take up motor control circuit 157, and is so made that it conducts in response to an output of an inverter IV2 which inverts signals obtained corresponding to ON, OFF of the second trigger switch 44 at the camera side 1 as the power source switch 150 is actuated, and to a low level output of a NOR gate G3 which receives the output of the above-mentioned AND gate G2. Numeral 158 is a tape rewinding motor at the above-mentioned driving means 146 for rewinding tape (FIG. 1), and 159 is a tape rewinding motor control circuit to control the tape rewinding motor 158. Q4 is a pnp switching transistor for controlling a power supply to the tape rewinding motor control circuit 159, and is so made that it conducts in response to a low level output of an inverter IV3 which inverts the output of the AND gate G2. G5 is a pnp switching transistor for controlling a pinch roller solenoid, which is so made as to conduct as its base becomes low as the second trigger switch 55 is actuated and when the power source switch 150 is actuated. And the pinch roller solenoid 143 is connected to the transistor Q5 so that the pinch roller 134 is made to pressure contact with the capstan 130 (FIGS. 1 and 3(a) and 3(b)), as it conducts when the transistor Q5 conducts. A latching solenoid 160 includes electromagnetic latching means for latching the tape loading arms 116A and 116B for determining proper positions of the slanted pins 114A and 114B and the guide posts 115A and 115B at their tape loading completion positions shown in FIG. 1 and FIG. 3(b). Q6 is a pnp transistor for controlling a power supply to the latching solenoid 160, and is so made that it conducts in response to a low level output of an OR gate G4 which receives signals obtained corresponding to ON, OFF of the conductive contacting piece 128a of the detection brush 128 at the position detection means 125, and signals obtained corresponding to ON, OFF of the first trigger switch 54 at the camera side 1, thereby supplying power to the latching solenoid 160 so that the loading arms 116A and 116B are latched.

The arrangement of circuit systems shown in FIG. 6 is limited to the portions directly relating to the present invention with a consideration that apprehension of the present invention will not be made difficult by said limitation. Therefore, indications on the drawings are omitted, for example, for arrangements of function for operating the various buttons at the recorder 100, and arrangements on the camera side 1 for monitoring an image projection using the image projection tube 18 when a reproduction is done at the recorder side 100. But for these omitted arrangements, what is already known can be combined to the arrangement shown in FIG. 6.

Now, first when the tape cassette 101 is loaded into the recorder 100, since the loading arms 116A and 116B and mechanical systems related thereto are in a state shown in FIG. 3(a), at this time, the slanted pin 114A and the guide post 115A, as well as the slanted pin 114B and the guide post 115B together with the capstan 130 proceed through the notches 101a and 101b of the cassette 101, as the cassette 101 is loaded, into the cassette 101 and become located at the reverse side of the tape 104 positioned between the guide rollers 105 and 106 of the cassette 104. Also at this state, since the printed disc 126 at the position detection means 125 is in a state shown in FIG. 5(a) against the detection brush 128, the conductive contacting piece 128a is in OFF state, while the conductive contacting piece 128b is in ON state.

When the operating knob 148 at the recorder side 100 is operated under this state for placing the power source switch in ON state, the heater 17 of the image pick up tube 14 and the heater 20 of the image projection tube 18 have power supplied thereto from the power source unit 147 provided at the recorder side 100, and are placed in an excited state, thus heating of a cathode in each of the image pick up tube 14 and of the image projection tube 18 will be started. And when the trigger button 46 at the camera side 1 under this state is pressed to its first step, the first trigger switch 54 becomes ON, and thereby makes conductive the transistor Q1 at the camera side 1. Therefore, the image pick up tube control circuit 58, the video process circuit 59, the image projection display circuit 60, the image projection tube control circuit 61, the diaphragm control circuit 62, the audio amplifier 64 and the display unit 21, etc., have power supplied thereto from the power source unit 147 at the recorder side 100, and they start operation. THus, an image pick up operation of the camera 1 is started, so that video signals and brightness signals are provided from the video process circuit 59 and also audio signals are provided from the audio amplifier 64. Then at the same time, a display of projection of the image by the image projection tube 18, regulating of the iris diaphragm 10 by the iris diaphragm regulating motor 11, and displays of brightness warning and audio signal levels, etc., by the display unit 21 will be performed.

Also since the zooming control circuit 63 also receives a power supply in this state, auto-zooming can be done by the zooming motor 38 through operation of the zooming switches 41 and 42 with the auto zooming operating button 40. Also, if the auto-focusing-manual-focusing change over switch 65 is changed over to the terminal A side (auto-focusing mode) by the operating knob 37, the range and focus detection circuit 30 will receive power supply together with the other circuits mentioned above and will start its operation. Thus, the circuit 30 will control the auto-focusing motor 31 for focusing the taking lens system (L1 to L5) with an object at this time based on the results of said range and focus detection, and a display of the focusing state will be provided by the display unit 21.

On the other hand, at the recorder side 100, when the first trigger switch is placed ON at the camera side 1, the transistor Q2 conducts, therefore the image transcription circuit 151, the audio signal and control signal recording circuit 152, the cylinder motor control circuit 153 and the capstan motor control circuit 154 have power supplied thereto from the power source unit 147 to start their operations, so that the recording video signals are given to the image reproduction heads 113A and 113B, based on the output of the video process circuit 59 at the camera side 1, by the image transcription circuit 151. Also, the audio signals and the control signals are given to the audio signal and control signal reproduction head 129 based on the output of the audio amplifier 64 at the camera side 1, and the output of the video process circuit 59, from the audio signal and control signal recording circuit 152. And at the same time, the rotation driving of the rotating cylinder 112B and the image reproduction heads 113A and 113B by the cylinder motor 140, and the rotation driving of the capstan by the capstan motor 142, etc., will be performed.

Also, when the first trigger switch 54 becomes ON at the camera side, the output of the inverter IV1 becomes high, and the conductive contacting piece 128a of the detection brush 128 becomes OFF under this state and its switch signal A becomes high (FIG. 5(b)). Therefore, the output of the AND gate G1 changes from low to high in response to the ON of the first trigger switch 54, and the loading motor control circuit 155 will rotate the loading motor 141 to its normal direction for effecting a tape loading. And when the loading motor 141 starts normal rotation, the loading arms 116A and 116B are rotated from their positions shown in FIG. 3(a) respectively to a clockwise direction and to a counter-clockwise direction. Therefore, at the time the tape cassette 101 is loaded, the slanted pin 114B and the guide post 115B are shifted from the unloading positions shown in FIG. 3(a) to a clockwise direction and a counterclockwise direction respectively against the slanted pin 114A and the guide post 115A which have proceeded through the notches 101a and 101b of the cassette 101, as shown in FIG. 3(a) into the cassette 101 to be located at the reverse side of the tape 104 which is placed between the guide rollers 105 and 106 within the cassette 101. Thus the tape 104 can be pulled out of the cassette 101.

Figure 3B:
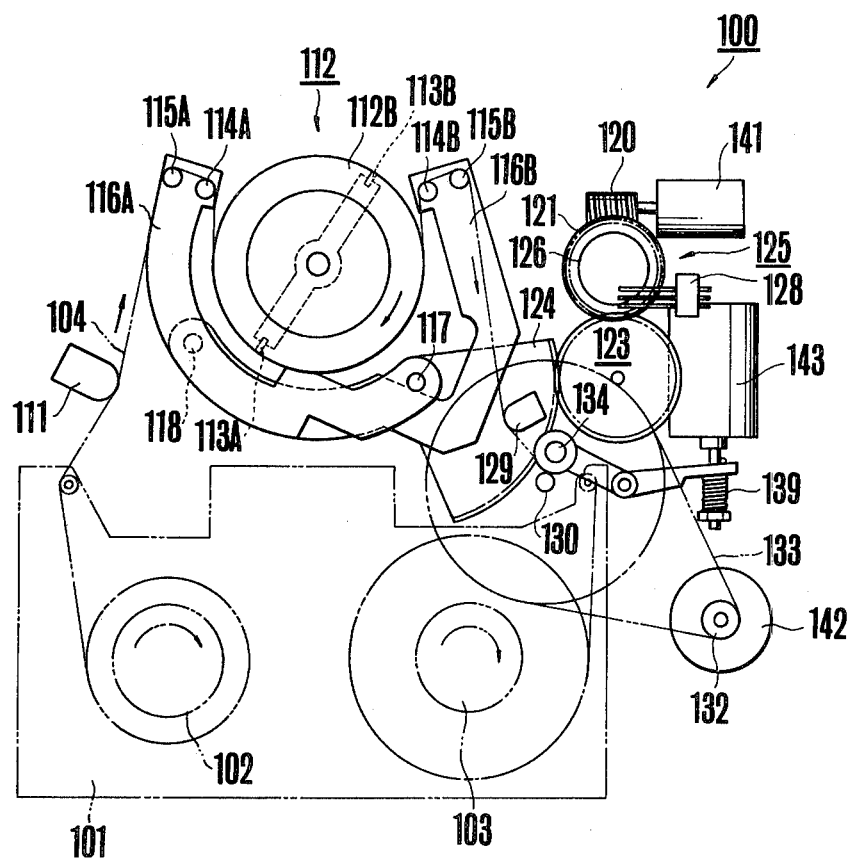
FIG. 3(b) shows a state in which a tape loading is completed and a recording is being done as the tape running system is operated.

And as the slanted pin 114A and the guide post 115A, as well as the slanted pin 114B and the guide post 115B, reach the loading positions shown in FIG. 1 and FIG. 3(b) by the rotation of the loading motor 141 to its normal direction, the conductive contacting piece 128a of the detection brush 128 at this time contacts the conductive pattern 127 of the printed disc 126 along with the rotation of said disc 126 to a clockwise direction and becomes ON, so that the switch signal A becomes low (FIG. 5(b)), and the output of the AND gate G1 becomes low. Therefore, the loading motor control circuit 155 stops the loading motor 141 at this time, the slanted pin 114A and the guide post 115A as well as the slanted pin 114B and the guide post 115B are stopped at the tape loading position, and the tape 104 is placed around almost half of the external circumference of the head cylinder 112 as shown in the drawing. At the same time the tape 104 is placed in a loading state, it is brought in contact with the audio signal and control signal recording and reproducing head 129.

Also, as the conductive contacting piece 128a of the detection brush 128 becomes ON and its switch signal A becomes low, the output of the OR gate G4 becomes low. Therefore, the transistor Q6 conducts, and electromagnetic latching means not shown in the drawings are activated for latching the loading arms 116A and 116B so that their positions are determined at the loading completion positions shown in FIG. 1 and FIGS. 3(b).

Also, the transistors Q3, Q4 and Q5 under this state are in a non-conductive state, therefore the tape take up driving means 145 and the tape rewinding means 146 are placed in a non-operative state. Also, the pinch roller 134 is in a state of being separated from the capstan 130, thus the tape running system is in a non-operative state. Therefore, the running of the tape 104 and the recording state is not yet started, and the signal recording system only is placed in an operative state, while the recorder 100 is in the tape loading completion state and the tape running system is left in a non-operative state, that is, a recording stand-by state is retained.

Now, when the trigger button 46 at the camera side 1 is pressed down to its second step under this state, the second trigger switch 55 becomes ON, and the transistor Q5 is conductive at the recorder side 100, then power is supplied to the pinch roller solenoid 143. Therefore, its armature 138 is attracted and the pinch roller 134 is made to pressure contact the capstan 130 sandwiching the tape 104 as shown in FIG. 1 and FIG. 3(b) by the pressure contacting power of the coil spring 139 at this time. As the second trigger switch 55 becomes ON, the output of the NOR gate G3 changes from high to low as the output of the inverter IV2 becomes high, therefore the transistor Q3 conducts, and the tape take up motor 156 and the tape take up driving means are actuated by this, so that the core 103 at the tape take up side of the tape cassette 101 is rotated at a clockwise direction in the drawing. Therefore, the tape running system is actuated and the running of the tape 104 to the direction of arrow in FIG. 1 and FIG. 3(a) is started. Then at this time, by the outputs from the video process circuit 59 and the audio amplifier 64 at the camera side 1, the video signals will be recorded on the running tape 104 through the image transcription circuit 151 and the rotating magnetic heads 113A and 113B, and the audio signals and the control signals are recorded on the tape through the audio signal and control signal recording circuit 152 and the magnet head 129, in a well known manner.

Now, at the camera side at this time a tally display is made by the display unit 21 based on the low level signal obtained by the ON state of the second trigger switch 55.

Next, when the pressing of the trigger button 46 at the camera side 1 is released under said recording state for completing the recording, first the second trigger switch 55 becomes OFF and the base of the transistor Q5 at the recorder side 100 becomes high. Then, as said transistor Q5 becomes non-conductive, power supply to the pinch roller solenoid 143 is stopped, and as a result the armature rod 138 protrudes, so that the pinch roller 134 is separated from the capstan 130. Also at this time, since the output of the NOR gate G3 becomes high and the transistor Q3 becomes non-conductive as the output of the inverter IV2 becomes low, the operation of the tape take up motor 156 and the operation of the tape take up driving means 145 is stopped. Thus the recorder 100 has its tape running system placed in a non-operative state by the OFF state of the second trigger switch 55, and thereby it is set again in the above-mentioned recording stand-by state.

Next, as the first trigger switch 54 further becomes OFF, the base of the transistor Q1 at the camera side becomes high and said transistor is placed in a non-operative state, therefore power supply is stopped to all the circuit systems except the heater 17 of the image pick up tube 14 and the heater 20 of the image projection tube 18, so that the circuit systems stop operations. Further, the base of the transistor Q2 at the recorder side 100 and thus the transistor Q2 becomes non-conductive, therefore power supply to the image transcription circuit 151, the audio signal and control signal recording circuit 152, the cylinder motor control circuit 154, that is, the operation of the signal recording system, is stopped.

Also, when the first trigger switch 54 is made OFF, the output of the OR gate G4 at the recorder side 100 becomes high, therefore the transistor Q6 becomes non-conductive and power to the latching solenoid 160 is stopped, thereby releasing the latching of the tape loading arms 116A and 116B by electromagnetic latching means not shown in the drawing. Also, the conductive contacting piece 128b of the detection brush 128 becomes OFF at this time and its switch signal B becomes high (FIG. 5(b)), thus the output of the AND gate G2 becomes high by the OFF state of the first trigger switch 54. In response thereto, the tape unloading motor control circuit 155 starts a reversal of the loading motor 141 for effecting the tape unloading, therefore the loading arms 116A and 116B are rotated to a counterclockwise direction and a clockwise direction respectively, and the slanted pin 114B and the guide post 115A as well as the slanted pin 114A and the guide post 115B are shifted from the loading positions shown in FIG. 1 and FIG. 3(b) to the unloading positions shown in FIG. 3(a) toward a counterclockwise direction and a clockwise direction, respectively. Also, since the output of the AND gate G2 at this time becomes high, the outputs of the NOR gate G3 and of the inverter IV3 both become low, and the transistors Q3 and Q4 conduct. Therefore, the tape take up motor 156 and the tape rewinding motor 158, hence the tape take up means 145 and the tape rewinding means 146 are activated, and the core 103 at the tape taking up side of the tape cassette 101 is rotated to a clockwise direction while the core 102 at the tape supply side is rotated to a counterclockwise direction, so that the tape 104 will be housed in the cassette 101. And as shown in FIG. 3(a), the slanted pin 114A and the guide post 115A as well as the slanted pin 114B and the guide post 115B reach the tape unloading positions, and the tape 104 will be completely housed in the cassette 101. Then the conductive contacting piece 128b of the detection brush 128 contacts the conductive pattern 127 and becomes ON, thus its switch signal B becomes low (FIG. 5(b)). Therefore, the output of the AND gate G2 becomes low, thus the loading motor control circuit 155 stops the loading motor 141. At the same time, since the outputs of the NOR gate G3 and the inverter IV3 both become high, the transistors Q3 and Q4 become non-conductive, thus the tape take up motor 156 and the tape rewinding motor 158, and hence the tape take up driving means 145 and the tape rewinding driving means 146 are stopped. Therefore, the recorder 100 will have stopped all its operations at a state when the tape unloading is completed.

As has been explained above, in the example of the present invention shown in FIG. 1 to FIG. 6, when the camera 1 is connected to the recorder 100 and the power source switch 150 at the recorder side is actuated, the heater 17 of the image pick up tube 14 at the camera side and the heater 20 of the image projection tube 18 have power supplied thereto and are excited, thus each cathode is heated. Then, as the first trigger switch 54 of the camera 1 is actuated, the camera 1 starts its operation, and on the other hand, the recorder 100 is placed in a recording stand-by state in which only the signal recording system is activated while the tape running system is left in an inactive state, and the tape loading is performed at said signal recording system. Then, as the second trigger switch 55 of the camera 1 is actuated, the tape running system at the recorder side is activated so that the recording is started.

Next, some partially modified examples of the above-mentioned example shall be explained.

First, in the recorder 100 of the above-mentioned example, the loading of the tape 104 into the signal recording system is done at the recorder side by the actuation of the first trigger 54 at the camera side, and at the same time, said signal recording system is set in an active state. Then the tape running is activated as the second trigger switch 55 is actuated, thus the recording is started.

Now, in general, in tape loading it takes about 1 to 2 seconds from the beginning of a tape loading until its completion. Therefore, when the second trigger switch 55 is actuated immediately after the first trigger switch 54 is actuated, then so-called rapid picture taking characteristics (instant image transcription) are needed. Such tape loading, could be taken care of, as an example, by placing the tape cassette 101 into the recorder 100.

Explanations shall be made on the above procedure by referring to FIG. 7. In this drawing, the circuit system arrangements of important parts, which are different from the arrangements in the electrical circuit system of the recorder 100 shown in FIG. 6, are shown when the tape loading is done immediately at a time the tape cassette 101 is loaded into the recorder 100. In FIG. 7, a cassette loading detection switch 162 will be opened by a loading of the tape cassette 101 into the recorder 100. An eject switch 163 is so made as being opened by a pressing of an eject button 144 shown in FIG. 1.

Here, the above-mentioned AND gate G1, which gives a positive rotation instruction for the loading motor 141 to the loading motor control circuit 155, is so made as giving such outputs of the inverter IV4 as inverting the signal obtained according to ON, OFF of the cassette loading detection switch 162 (low signal by ON, high signal by OFF) and the signal obtained according to ON, OFF of the eject switch 163 (low signal by ON, high signal by OFF), as well as providing the above-mentioned positive rotation instruction upon receiving the switch instruction A of the conductive contacting piece 128a of the detection brush 128. Also, the above-mentioned AND gate G2, which gives a reverse rotation instruction to the loading motor 141, is so made as providing said reverse rotation instruction upon receiving the signal obtained according to ON, OFF of the eject switch 163 and the switch signal B of the conductive contacting piece 128b of the detection brush 128.

Also, the above-mentioned OR gate G4, which gives a conductive signal to the transistor Q6 for controlling the current to the solenoid 160 for latching, is made to receive the signal obtained according to ON, OFF of the eject switch 163 and the switch signal A of the conductive contacting piece 128a.

An ejecting solenoid 161 forms electromagnetic cassette eject means for ejecting the tape cassette 101 from a cassette loading chamber of the recorder 100. Q7 is a pnp switching transistor to control a current to the solenoid 161 for ejecting, and is so made that it conducts in response to the output of the converter IV5 which inverts the switch signal B of the conductive contacting piece 128b and the low level output of the NAND gate G5 which receives the signal obtained according to ON, OFF of the eject switch 163. Other than the above, this example has the same arrangements as those shown in FIG. 6.

Now, when the tape cassette 101 is loaded into a cassette loading chamber of the recorder 100 having the arrangements just mentioned above under a state that the power source switch 150 is in, the cassette loading detection switch 162 is opened thereby, thus the output of the AND gate G1 becomes high. Therefore, the loading motor 141 is rotated to normal direction by the loading motor control circuit 155, thus the tape loading will be done in a manner mentioned above. Thereafter, the signal recording system is activated by the first trigger switch 54 being operated at the camera side 1, and the tape running system is activated by the second trigger switch being operated in the exact same manner as in the above-mentioned example. Here, in the arrangements of this modified example, the tape unloading after a completion of the recording is done by an opening of the eject switch 163, by a pressing of the eject button 144. That is, when the eject switch 163 is opened by pressing of the eject button 144, the output of the OR gate G4 becomes high thereby, thus the transistor Q6 is placed in a non-conductive state, stopping the current to the latching solenoid 160, so that the latching of the loading arms 116A and 116B is released, and the output of the AND gate G2 becomes high, so that the loading motor 141 is rotated to a reverse direction. Also, at the same time, as the outputs of the NOR gate G3 and the inverter IV3 become low, so that the transistors Q3 and Q4 conduct, then the tape take up motor 156 and the tape rewinding motor 158, and hence the tape take up driving means 145 and the tape rewinding driving means 146 are activated. Accordingly, the tape unloading will be done as mentioned above.

And since the conductive contacting piece 128b of the detection brush 128 contacts the conductive pattern 127 and becomes ON at a time when the tape unloading is completed, then the switch signal B thereof becomes low. Therefore, the loading motor 141 and the tape take up motor 156 as well as the tape rewinding motor 158 are stopped, and the output of the inverter IV5 becomes high, so that the output of the NAND gate G5 becomes low, and the transistor Q7 conducts. Accordingly, power is supplied to the ejecting solenoid 161, and electromagnetic eject means not shown in the drawing is activated thereby, and the tape cassette 101 is, for example, popped up to be ejected from the cassette loading chamber of the recorder 100. At this time, the cassette loading detection switch 162 will be closed by its own characteristics.

As has been explained above, in the modified example shown in FIG. 7, the tape loading is done immediately by the loading of the tape cassette 101 into the recorder 100, thus it is advantageous in so-called rapid picture taking characteristics.

Next, for the camera 1, while the image pick up tube 14 as image pick up means and the image projection tube (CRT display tube) 18 as image projection display means are employed in the foregoing examples, for the benefit of so-called rapid picture taking characteristics and for solving the problem of power loss, etc., at the camera side 1, a solid state image pick up element as image pick up means and a solid state image projection element as image projection display means may be used, or an optical viewfinder may be used for a viewfinder system.

Figure 8A:
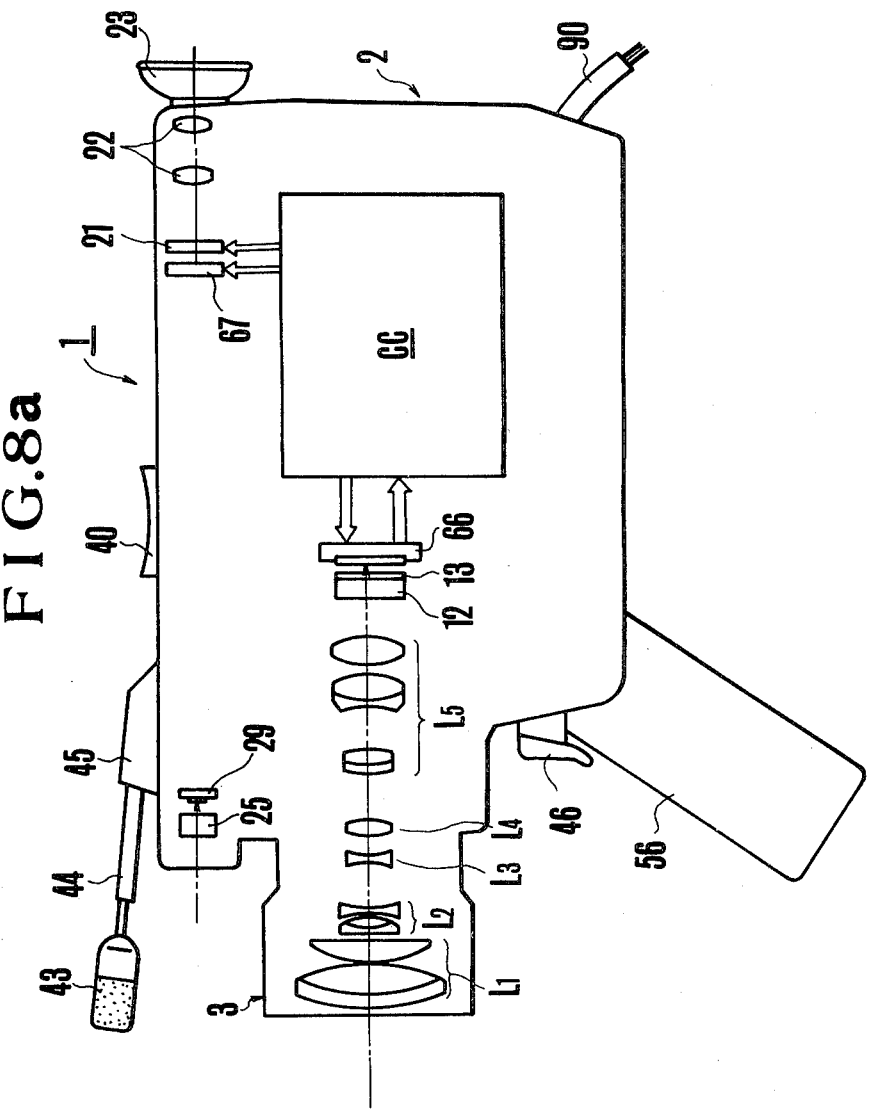
FIGS. 8(a) and (b) are schematic drawings to show outlines of arrangements of two modified forms of a video camera which are suitable for the system of said example.

Now, the above will be explained by referring to FIG. 8. First, FIG. 8(a) shows an outline of an optical arrangement in case a solid image pick up element as image pick up means and a solid image projection element as image projection display means are used, including a solid state image pick up element 66, and a solid state image projection element 67. As the solid image pick up element 66, for example, MOS image sensor (photo diode array), CCD image sensor or BBD image sensor, etc., may be used. Also, as the solid image projection element 67, for example LC (liquid crystal) display element, EL (electro luminescence) display element or LED (light emitting diode) display element, etc., may be used. Also, FIG. 8(b) shows an outline of an optical arrangement in case the solid image pick up element 66 is used as image pick up means and an optical viewfinder is used as a viewfinder system, wherein numerals 69, 70 and 71 are imaging lenses for a viewfinder, and 72 is a reflective mirror, while 73 is a focus plate, and these components constitute a viewfinder optical system together with an eyepiece lens 22. And said system has here an arrangement of a TTL viewfinder in which light split by a beam splitter 68, placed between the afocal lens L4 and the relay lens L5, is received. Now, in this case, the focus plate 73 is placed at a primary focusing plane, and the display unit 21 is placed at a secondary focusing plane. And when the arrangement of the camera 1 as shown in FIGS. 8(a) and 8(b) is employed, the arrangement of its electrical circuit systems is such that the solid image pick up element 66 and the solid image projection element 67 may have power supplied thereto from the power source unit 147 provided at the recorder 100 together with other circuits by the conductance of the transistor Q1 which conducts by the ON of the first trigger switch 54. Also in this case, the image pick up tube control circuit 58 shown at the camera side in FIG. 6 is replaced by an image pick up element driving circuit, and the image projection tube control circuit 61 is replaced by an image projection element driving circuit. Of course, when the arrangement of FIG. 8(a) is used, the image projection tube 18, the image projection display circuit 60 and the image projection tube control circuit 61 are not needed. Also, in FIGS. 8(a) and 8(b), what is shown as CC means such a camera circuit.

Next, another example of the present invention shall be explained. This example is to provide a third switch which inevitably needs to be operated for video recording before the first and second trigger switches and in addition to said two trigger switches, so that the camera is set in an image pick up (shooting) preparatory state or in an image pick up (shooting) stand-by state by operating the third switch. Then, an image pick up operation of the camera is started by operation of the first trigger switch, and at the same time the recorder is set in a recording stand-by state. A recording operation of the recorder is started by operating the second trigger switch.

First, referring to FIG. 9, which chiefly shows an arrangement of important parts, especially those different from the arrangement shown in FIG. 1 and FIG. 2, and shows two examples of the video camera 1 as applied to the system of said another example, a third switch 74 is inevitably operated for video recording before the first and second trigger switches 54 and 55. The third switch 74 in the example of the camera 1 shown in FIG. 9(a) is so made as to be actuated when the grip 56 is erected to the service position shown by solid line from the non-service position shown by two dot chain lines by a switch operating part 75 associated with the grip 56. Also, the third switch 74 in the example of the camera 1 shown in FIG. 9(b) is housed in the grip 56, and is so made that said switch 74 is actuated by a switch operating pin 76a provided at an internal plane of a switch operating member 76 formed as a part of a casing of the grip 56, when the member 76 is rotated toward the inside of the main body of the grip 56, that is, toward the counterclockwise direction around a hinge shaft 77 against a spring 78 by grasping the grip 56 by hand.

What is shown as 74' in FIGS. 9(a) and 9(b) is an auxiliary switch which functions as the third switch mentioned above in place of the above-mentioned switch 74 when a tripod is used. And said switch 74' is so made as to be actuated when a fixing screw at a tripod side is screwed into a threaded hole 57 as the camera 1 is attached to the tripod and its pin 74'a is pressed by said screw. Also, what is shown as 80 is a remote controller connected to a remote connector 79 at the camera side, and has first and second remote switches 82 and 83 which are actuated in turn by pressing of an operating button 81 thereof, housed therein. Here, concerning the operating button 81 of the remote controller 80, it will be advantageous that a similar arrangement as the resisting power functional mechanism provided in the camera 1 against the trigger button 46 be employed, so that a difference between a stroke movement to actuate the first remote switch 82 by a first stage pressing force, and a stroke movement to actuate the second remote switch 83 by a second stage pressing force can be distinctly felt. Also, said first and second remote switches 82 and 83 are connected in parallel with the first and second trigger switches 54 and 55 at the camera side, respectively, by connection of the remote controller 80 to the camera 1. Also, at the camera 1 side, the auxiliary switch 74' may be connected in parallel with the third switch 74. Other than the above, the arrangements are the same as those in the camera used for the system of the examples previously mentioned above.

A video camera applied to the system of the present example has the above-mentioned arrangements added to the video camera of the system previously mentioned above, and concerning a video recorder, the recorder used in the system of the previously mentioned examples is used as it is.

Next, explanation will be made on an arrangement of electrical circuit systems of a camera having the arrangement just mentioned above, referring to FIG. 10. In the camera 1 shown in the drawing, what is shown as Q8 is a pnp switching transistor which conducts as its base becomes low by the third switch 74 or the auxiliary switch 74' connected in parallel therewith being actuated, and here the heater 17 of the image pick up tube 14 and the heater 20 of the image projection tube 18 have power supplied thereto from the power source unit 147 provided at the recorder 100 side by the conductance of said transistor Q8. Also, the first and second remote switches 82 and 83 at the remote controller 80 are connected in parallel with the first and second trigger switches 54 and 55, respectively, through the remote connector 79 as shown in the drawing. Other than the above, the arrangements are exactly the same as those in the electrical circuit systems of the camera 1 shown in FIG. 6, and the recorder 100 has also the exact same connection arrangements as those shown in FIG. 6.

In a video recording system made of a combination of such video camera 1 and a video recorder 100 as mentioned above, in order to conduct a video recording, for example, in the case of the camera 1 shown in FIG. 9(a), as the grip 56 is erected to its service position, and in the case of the camera 1 shown in FIG. 9(b) as the grip 56 is grasped, or as the camera 1 is attached to a tripod, then the third switch 74 or the auxiliary switch 74' becomes ON so that the transistor Q8 conducts. Then, the heater 17 of the image pick up tube 14 and the heater 20 of the image projection tube 18 have power supplied thereto from the power source unit 147 provided at the recorder 100 and are excited, thus each cathode is heated and the camera 1 is set in an image pick up stand-by state. Next, as the first trigger switch 54 at the camera 1 or the first remote switch 82 of the remote controller 80 is actuated under said state, an image pick up action of the camera 1 is started in the same manner as previously explained. Further, the recorder 100 has its signal recording system activated while the tape running system is set in a recording stand-by state in which the signal recording system is activated while the tape running system is left in an inactive state and a tape loading is done. Then, as the second trigger switch 55 or the remote switch 83 of the remote controller 80 is actuated, the recording action is started to perform a recording as the tape running system is activated at the recorder side, in the same manner as previously mentioned.

Now, in the arrangement of the system of the example just explained above, the tape loading is done at the recorder side as the first trigger switch 54 or the first remote switch 82 is actuated. Therefore, in a case when the second trigger switch 55 or the second remote switch 83 is put in immediately after the first trigger switch 54 or the first remote switch 82 is put in, that is, for a case in which so-called rapid shooting characteristics are needed, said arrangement could seem to have some disadvantage. However, in this respect, the arrangement of the camera 1 applied to the system of this example has such set up that the loading of the tape 104 is done at the recorder side by the third switch 74 or the auxiliary switch 74' actuated, thereby eliminating said disadvantage.

Figure 10:
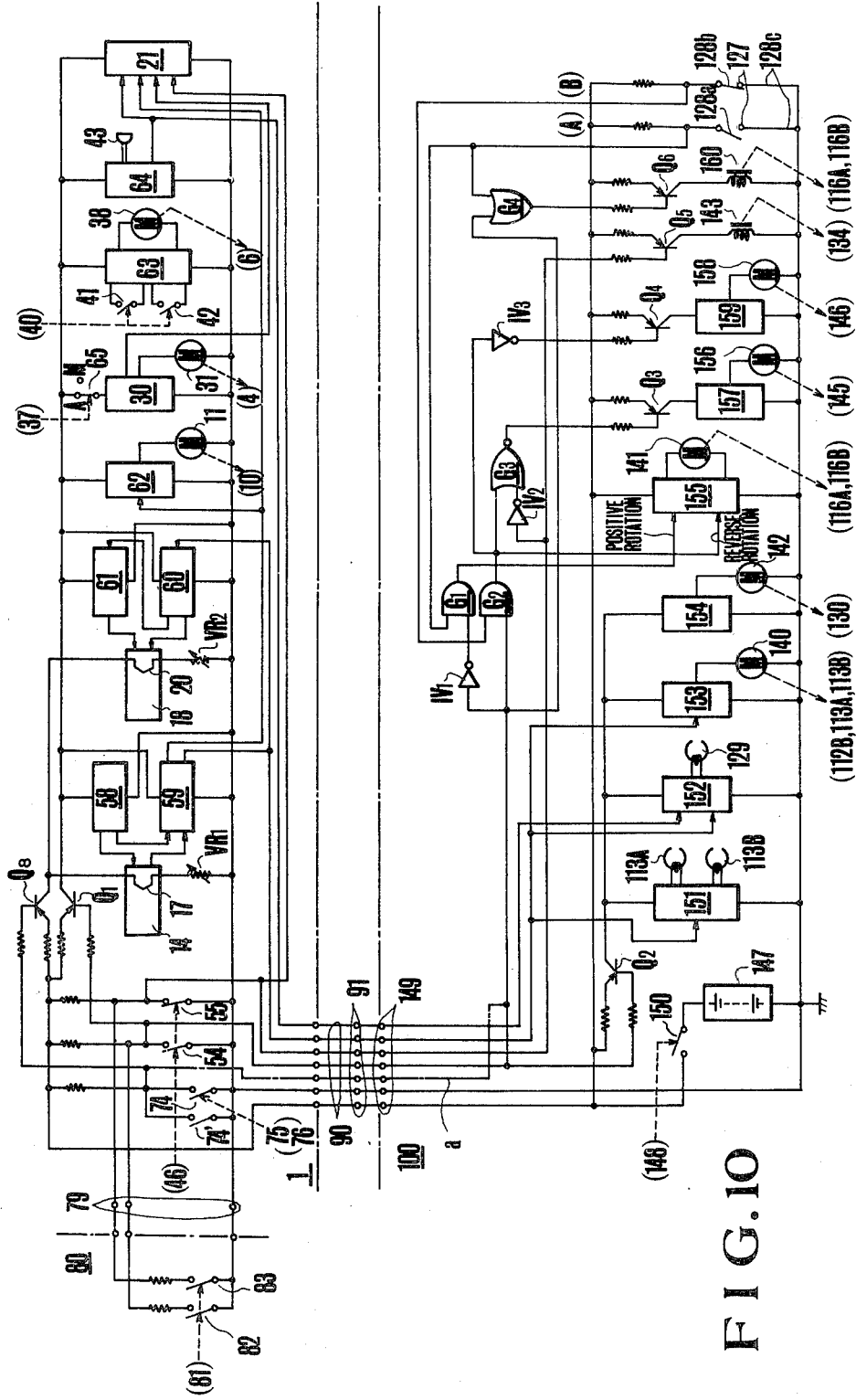
FIG. 10 is a circuit connection diagram of a video camera and a video recorder to show an arrangement of an electrical circuit system of the other example.

That is, as shown by the signal line "a" with one dot chain line in FIG. 10, the signal inputs into the inverter IV1, the AND gate G2 and the OR gate G4 may be so changed as replacing the signals obtained according to ON, OFF of the first trigger switch 54 and the first remote switch 82, with the signals obtained according to ON, OFF of the third switch 74 and the auxiliary switch 74'.

Also, when the third switch 74 or the auxiliary switch 74' is left in a state of being actuated for a long time in the arrangement of the system just explained above, there is a problem of power loss to some degree at the camera side 1. But, even for this matter, in the arrangement of this example, for example, a lower level of current being a few tens percent of a rated current is supplied to the heater 17 of the image pick up tube 14 and the heater 20 of the image projection tube 18 by the third switch 74 or the auxiliary switch 74' being put in, thereby exciting said heaters beforehand for preheating of cathodes, thus placing the camera 1 in an image pick up preparatory state. Also, rated current is supplied by the first trigger switch 54 or the first remote switch being put in for exciting the same completely, thus effecting a complete heating of the cathodes to start an image pick up action of the camera 1, eliminating said disadvantage.

Figure 11A:
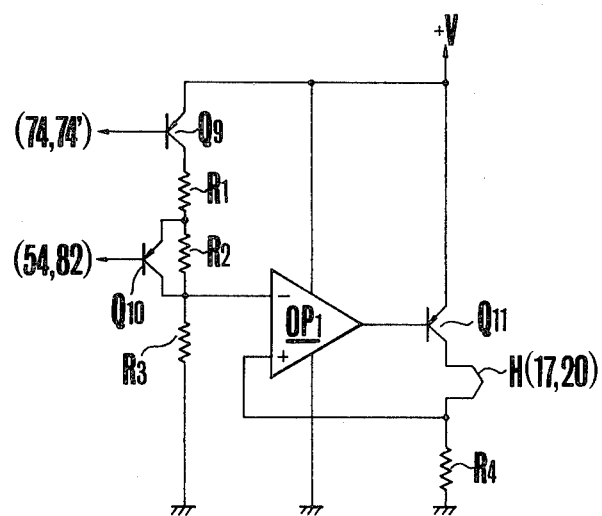
FIGS. 11(a) and (b) are circuit diagrams of important parts showing two forms of circuitry which can be employed in a video camera used in the system of the other example, and serve to stepwise conduct an excitation of a heater circuit of an image pick up tube and/or of an image projection tube.
Figure 11B:
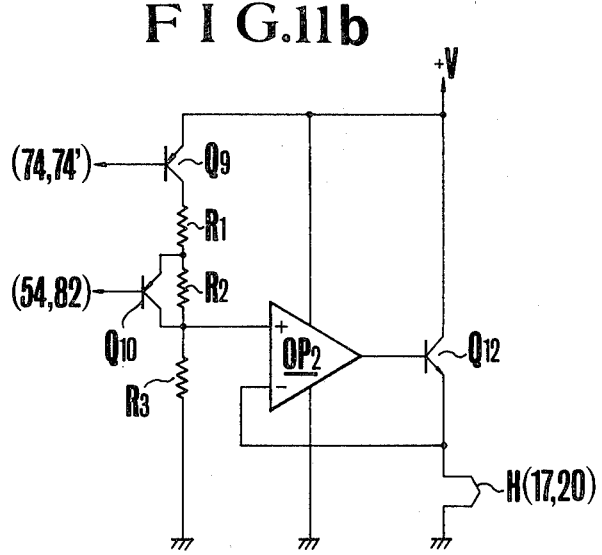

FIG. 11 shows two examples of a power supply control circuit to the heater 17 of the image pick up tube 14 and the heater 20 of the image projection tube 18 as applied to this example. In the drawing, H means the heater 17 of the image pick up tube 14 or the heater 20 of the image projection tube 18, and Q9 is a pnp switching transistor which conducts as its base becomes low by the third switch 74 or the auxiliary switch 74' being put in. R1, R2 and R3 are load resistances connected in series to a collector side of the transistor Q9, and what is shown as Q10 is a pnp switching transistor for short-circuiting the resistance R2, being conductive when the first trigger switch 54 or the first remote switch 82 is actuated. And in the example shown in FIG. 11(a), an inverting input terminal of an operation amplifier OP1 is connected to a voltage dividing point of the resistances R1 and R2, and of the resistance R3, and on the other hand in the example shown in FIG. 11(b) a non-inverting input terminal of an operation amplifier OP2 is connected to said voltage dividing point. Also, in the example shown in FIG. 11(a), what is shown as Q11 is a pnp transistor for current control responding to an output of the operation amplifier OP1, and the heater H is connected to the collector side of the transistor Q11 together with a load resistance R4. Also, in the example shown in FIG. 11(b), what is shown as Q12 is an npn transistor as an impedance element responding to an output of the operation amplifier OP2, and the heater H and an inversion input terminal of the operation amplifier OP2 are connected to the emitter side of the transistor Q12.

First, in the example shown in FIG. 11(a), since the transistor Q9 is in a non-conductive state as the third switch 74 and the auxiliary switch 74' are both in OFF state, non-inverting input potential of the operation amplifier OP1 is zero volt, therefore said operation amplifier OP1 will so function that its non-inverting input potential become zero volt, that is, its output becomes zero volt, therefore, the current flowing to the heater H become zero and said heater H is placed in a non-excited state.

Next, when the transistor Q9 conducts by the third switch 74 or the auxiliary switch 74' being put in, as the non-inverting input potential of the operation amplifier OP1 at this time becomes $$V \cdot R_3/(R_1+R_2+R_3)$$

current represented by $$I(1) = V R_3/[(R_1+R_2+R_3)\cdot R_4]$$

will flow to the heater H. Next, when the transistor Q10 conducts by the first trigger switch 54 or the first remote switch 82 being put in, since the non-inverting input potential of the operation amplifier OP1 becomes $$V \cdot R_3/(R_1+R_3)$$

current represented by $$I(2) = V R_3/[(R_1+R_3)\cdot R_4]$$

will flow to the heater H. Here, if I(2) is to represent a rated current for complete excitation of the heater H, the relationship among $R_1$, $R_2$ and $R_3$ satisfying the equation, $I(1)=I(2)/K$, will be given by the following formula:

$$K = I(2)/I(1) = (R_1+R_2+R_3)/(R_1+R_3).$$

Therefore, by suitably selecting values of the resistances $R_1$, $R_2$ and $R_3$ from a range of $K>1$, a preparatory excited state and a completely excited state of the heater H can be realized according to ON, OFF of the third switch 74 or the auxiliary switch 74, and to ON, OFF of the first trigger switch 54 or the first remote switch 82.

Also, in the example shown in FIG. 11(*b*), the above-mentioned function is obtained by variation in impressed voltage to the heater H by an impedance variation of the transistor Q12.

Now, in the above-mentioned example and modified examples, the tape loading is done at the recorder side 100 by the first trigger switch 54 (or the remote switch 84) being put in at the camera side 1, and at the same time the signal recording system is placed in an operative state or the signal recording system is placed in an operative state with the tape loading being in a completed state, then the tape running system is activated by the second trigger switch 55 (or the second remote switch 83) being put in. Therefore, the recording is started, and a length of time during which the tape 104 is held in a stationary state as being wound around the external circumference of the cylinder part, while the image transcription reproducing heads 113A and 113B are in a rotating state, can be shortened. Thus, by said arrangement only, the abrasion, damage of the magnetized plane of the tape 104 or the abrasion of the heads 113A and 113B can be reduced.

But, for example, for the problems of abrasion, damage of the magnetized plane of the tape 104 or the abrasion of the heads 113A and 113B, in a case when the camera 1 is to be retained at a monitoring state for the purpose of making a test for an object at a time of recording, that is, in a case when a state under which the first trigger switch 54 (or the first remote switch 82) only is put in for a long time is to be retained, in the arrangements of the examples and modified examples explained above, for example, by putting in the first trigger switch (or the first remote switch 82) at the camera 1 side in the case of the example shown in FIGS. 1 to 6 and FIGS. 9 and 10, and by the loading of the tape cassette 101 into the recorder 100 in the modified example shown in FIG. 7, also by putting in the third switch 74 or the auxiliary switch 74' at the camera 1 side in the case of the modified example explained in FIG. 10 (that is, when the connection arrangement of the signal line "a" is employed), respectively, the tape loading arms 116A and 116B are shifted from the unloading positions shown in FIG. 3(*a*) to such positions as keeping the tape 104 in a state that even if it is pulled out of the cassette 101 it will not come in circumferential contact with the cylinder part 12 (hereinafter this state will be called as a tape-pre-loading state)(hereinafter these positions will be called pre-loading positions) and is stopped there temporarily. Afterwards, the loading arms 116A and 116B may be shifted from the pre-loading positions shown in FIG. 12 to the loading positions shown in FIG. 1 and FIG. 3(*b*), by putting in the second trigger switch 55 (or the second remote switch 83) at the camera 1 side.

Now, explanation will be made for the above.

Figure 13A:
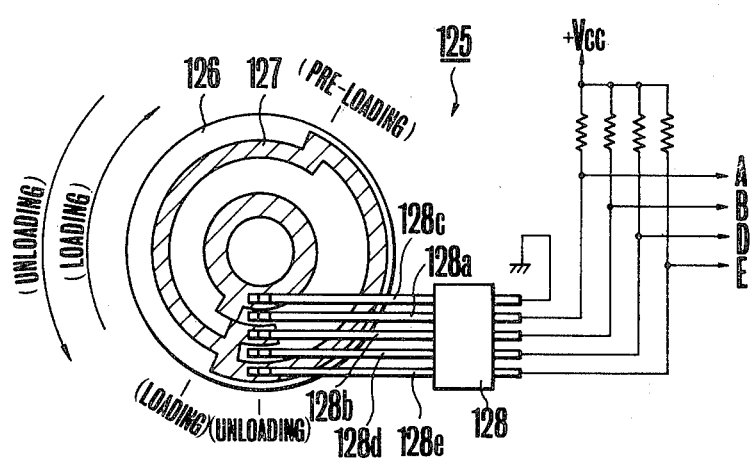
FIG. 13(a) is a plan to show details of position detection means in a tape loading mechanism block which is applied to the case when tape loading is done stepwise at the video recorder side.

First, FIG. 13 shows an example of the position detection means 125 at the recorder 100 which is needed when the above-mentioned arrangement is used. This example has an arrangement such that, as shown in FIG. 13(*a*), conductive contacting pieces 128*d* and 128*e* for detecting the pre-loading state are provided at the detection brush 128 in addition to the above-mentioned three conductive contacting pieces, 128*a* to 128*c*. Also, the conductive pattern 127 on the printed disc 126 is so made that high and low signals as shown in FIG. 13(*b*) are generated at output terminals A, B, D and E of the conductive contacting pieces 128*a*, 128*b*, 128*d* and 128*e*, along with the rotation of the worm wheel 121 between the unloading positions and the loading positions.

Now, when the above-mentioned arrangement is first applied to the example and the modified example shown in FIGS. 1 to 6 and FIGS. 9 and 10, the circuit system at the recorder 100 side is changed to what is shown as FIG. 14(*a*). That is, in FIG. 14(*a*), first, the AND gate G1 which is to give the normal rotation instruction of the loading motor 141 to the loading motor control circuit 155, is so made as receiving the output of the inverter IV1 and the switch signal D (FIG. 13(*b*)) obtained according to ON, OFF of the conductive contacting piece 128*d* at the detection brush 128, and the output of the gate G1 is given to the OR gate G7. G6 is an AND gate which is to receive the output of the inverter IV6 which inverts the signal obtained according to ON, OFF of the second trigger switch 55 or the second remote switch 83, and the switch signal A obtained according to ON, OFF of the conductive contacting piece 128*a* of the detection brush 128. And an output of said gate G6 is given to the OR gate G7 together with the output of the AND gate G1, and here the output of the OR gate G7 is given to the loading motor control circuit 155 as a normal rotation instruction. Here in this case, the high level output of the AND gate G1 becomes a pre-loading instruction for shifting from the unloading state to the pre-loading state, also, the high level output of the AND gate G6 becomes a loading instruction for shifting from the pre-loading state to the loading state.

G8 is an AND gate which receives the signal obtained according to ON, OFF of the second trigger switch 55 or the second remote switch 83 at the camera 1 side, and the switch signal E (FIG. 13(*b*)) obtained according to ON, OFF of the conductive contacting piece 128*e* of the detection brush 128. And an output of said gate G8 is given to the OR gate G9 together with the AND gate G2 for giving the reverse rotation instruction of the loading motor 141 to the loading motor control circuit 155. The output of the OR gate G9 is given to the loading motor control circuit 155 as the reverse rotation instruction. Now, in this case, the high level output of the AND gate G8 becomes the pre-loading instruction for shifting from the loading state to the pre-loading state, and the high level output of the AND gate G2 becomes the unloading instruction for shifting from the pre-unloading state to the unloading state.

Except for the above, the arrangement explained above has exactly the same arrangement as the circuit system shown in FIG. 6 and FIG. 10, except that the output of the OR gate G9 is given to the NOR gate G3 and the inverter IV3 in place of the output of the AND gate G2, and that the transistor Q5 for controlling the pinch roller solenoid is made to conduct by the low level output of the OR gate G4. Further, the output of the OR gate G4 is given to the inverter IV2, in place of the signal obtained according to ON, OFF of the second trigger switch 55 or the second remote switch 83 at the camera 1 side.

In such arrangement, first in the case of the example shown in FIG. 1 to FIG. 6 and FIGS. 9 and 10, as the first trigger switch 54 or the first remote switch 81 at the camera 1 side is put in, and in the case of the modified example explained in FIG. 10 (that is, the connection arrangement of the signal line "a" is employed), as the third switch 74 or the auxiliary switch 74' at the camera 1 side is put in, the output of the inverter IV1 becomes high and, as a result, the output of the AND gate G1 becomes high. Therefore, the loading motor control circuit 155 rotates the loading motor 141 to its normal direction, and the loading arms 116A and 116B are shifted from the unloading positions shown in FIG. 3(a) toward the pre-loading positions shown in FIG. 12. Then, as the loading arms 116A and 116B reach the pre-loading positions shown in FIG. 12, and the conductive contacting piece 128d comes in contact with the conductive pattern 127 as shown in FIG. 13(b) and becomes ON, switch signal D becomes low so that the output of the AND gate G1 becomes low. Therefore, the loading motor 141 will be stopped, so that the tape 104 is set in a pre-loading state such that even though the tape is pulled out of the cassette 101, it is still in non-circumferential contact relative to the cylinder part 112.

When the second trigger switch 55 or the second remote switch 83 at the camera 1 side is actuated under this state, the output of the inverter IV6 becomes high, and as a result, the output of the AND gate G6 becomes high, thus the loading motor control circuit 155 rotates the loading motor 141 to its normal direction again. Therefore, the loading arms 116A and 116B are shifted from the pre-loading positions shown in FIG. 12 to the loading positions shown in FIG. 1 and FIG. 3(b). Then, as the loading arms 116A and 116B reach the loading positions, the conductive contacting piece 128a comes in contact with the conductive pattern 127 and becomes ON, thus the output of the AND gate G6 becomes low. Therefore, the loading motor 141 is stopped at this time, and the tape 104 is set in the loading state.

As the switch signal A of the conductive contacting piece 128a becomes low at a time when the tape loading is completed, the output of the OR gate G4 becomes low. Therefore, the transistor Q6 conducts, and power is supplied to the latching solenoid 160, so that the loading arms 116A and 116B are latched at the loading positions. As power is supplied to the transistor Q5, the pinch roller solenoid 143 has power supplied thereto, and the pinch roller 134 is made to make pressure contact with the capstan 130, sandwiching the tape 104 therebetween. And at the same time, as the output of the inverter IV2 becomes high, the output of the NOR gate G3 becomes low, therefore power is supplied to the transistor Q3 and the tape take up motor 156, hence the tape take up driving means 145, is activated. Thus, the tape running system is activated in a state in which the tape loading is completed, wherein the running of the tape 104 is started for effecting a recording.

When the second trigger switch 55 or the second remote switch 83 is made OFF for completing the recording in this state, the output of the OR gate G4 becomes high. Therefore, the transistors Q5 and Q6 are placed in a non-conductive state, and power supply to the pinch roller solenoid 143 and the latching solenoid 160 is discontinued. Accordingly, the pinch roller 134 is separated from the capstan 130, and at the same time the latching of the loading arms 116A and 116B will be released Also at the same time, as the output of the AND gate G8 becomes high, the loading motor control circuit 155 rotates the loading motor 141 to the reverse direction; therefore, the loading arms 116A and 116B are shifted from the loading positions to the pre-loading positions. Also, at this time, while the output of the NOR gate G3 is retained low by the high level output of the AND gate G8, the output of the inverter IV3 becomes low, therefore the tape rewinding motor 158, hence the tape rewinding driving means 146, is activated in a state in which the tape take up driving means 145 are activated. Accordingly, the tape 104 is shifted to the pre-loading state shown in FIG. 12.

Figure 12:
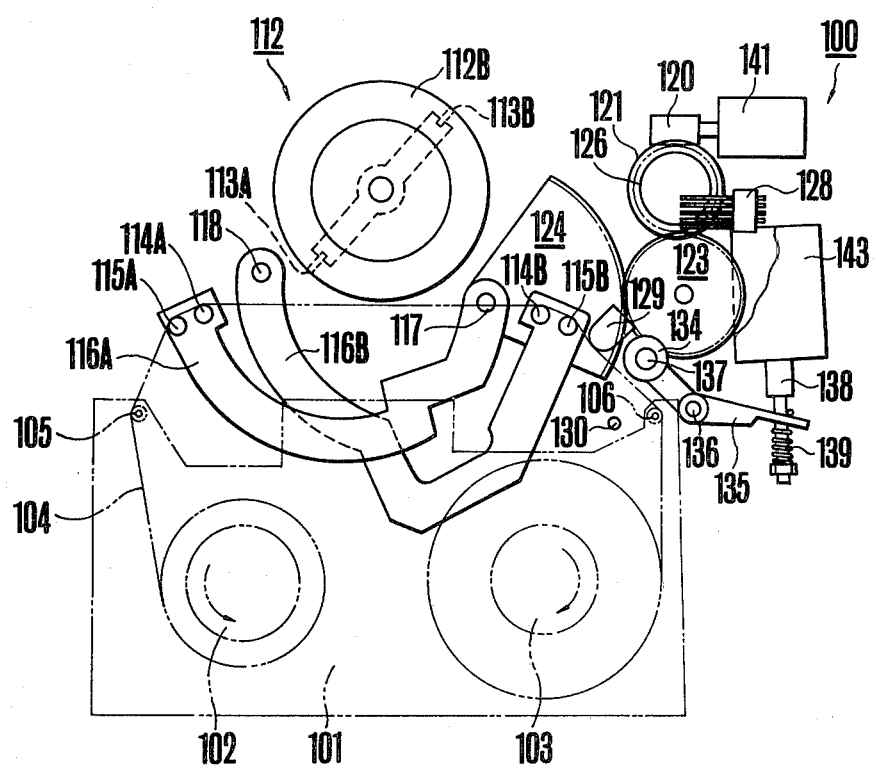
FIG. 12 is an operational diagram to show a setting state of a tape loading mechanism to a tape pre-loading position, when tape loading is done stepwise at a video recorder side.
Figure 13B:
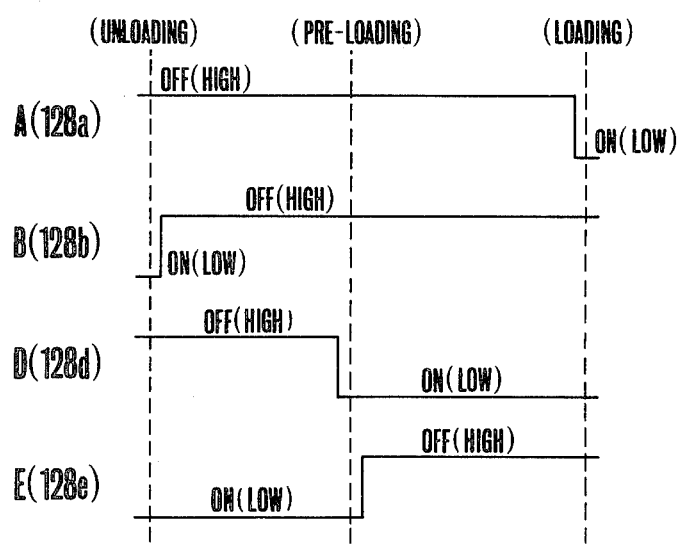
FIG. 13(b) is a drawing to show an output pattern of said position detection means.
Figure 14A:
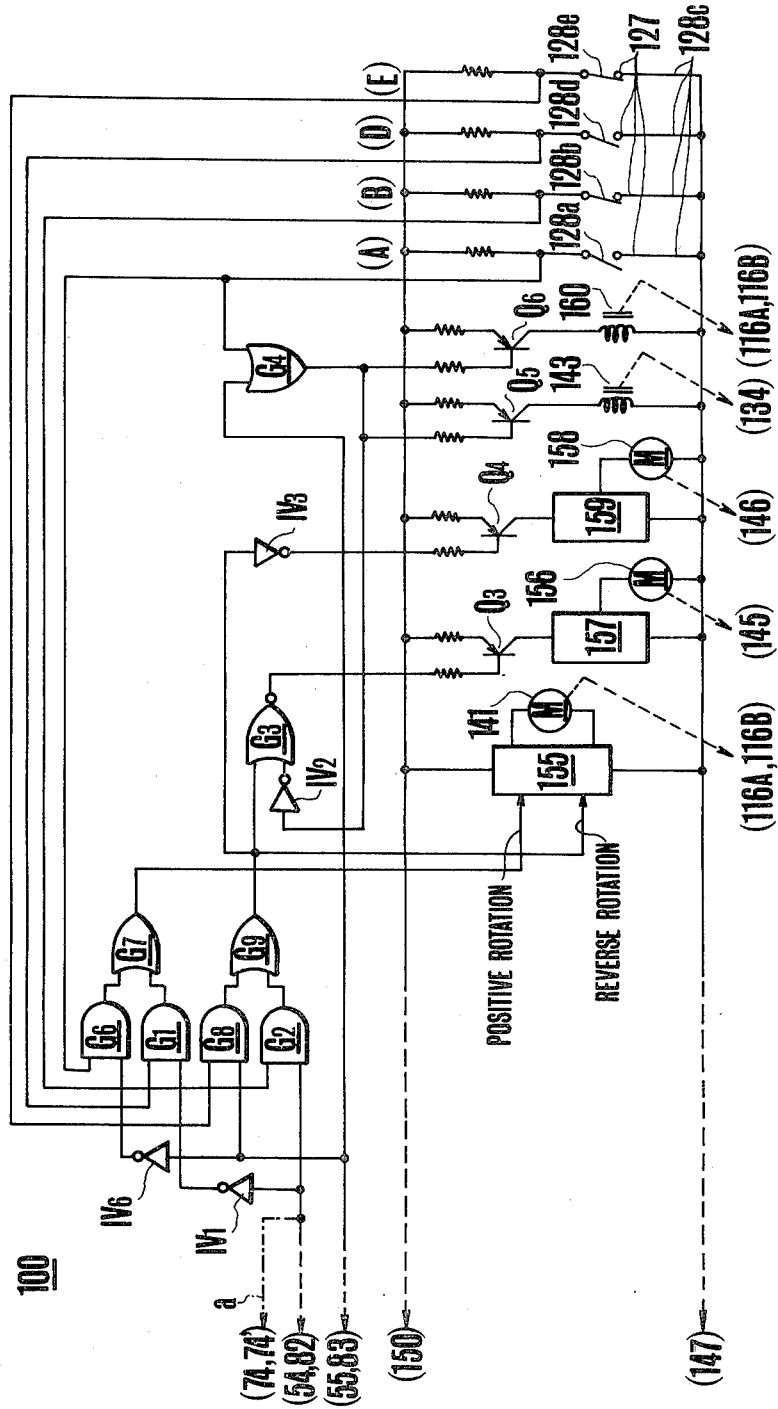
FIG. 14(a) is a circuit connection diagram of important parts to show chiefly an arrangement of circuit systems of important parts for a modification in the case when a tape loading is done stepwise at the video recorder side in the system of the example explained in FIGS. 1 to 6, and FIGS. 9 and 10.

And as the loading arms 116A and 116B reach the pre-loading positions shown in FIG. 12, the conductive contacting piece 128e contacts the conductive pattern 127 as shown in FIG. 13(b) at this time and becomes ON, so that its switch signal E becomes low. Therefore, the output of the AND gate G8 becomes low, and the outputs of the NOR gate G3 and the inverter IV3 becomes high, so that the loading motor 141, the tape take up motor 156 and the tape rewinding motor 158 are stopped. Thus, the tape 104 will be set in the pre-loading state shown in FIG. 12.

Afterward, for example, in the case of the example explained in FIGS. 1 to 6 and FIGS. 9 and 10, when the first trigger switch 54 or the first remote switch 82 is made OFF, and in the case of the modified example explained in reference to FIG. 10, when the third switch 74 or the auxiliary switch 74' is made OFF, the output of the AND gate G2 then becomes high. Also, the outputs of the NOR gate G3 and the inverter IV3 both become low, therefore the loading motor control circuit 155 again rotates the loading motor 141 to reverse the direction, and the tape take up motor 156 and the tape rewinding motor 158 are activated again, thus the tape 104 will be shifted from the pre-loading state shown in FIG. 12 to the unloading state shown in FIG. 3(a). And as the loading arms 116A and 116B reach the unloading positions shown in FIG. 3(a), the conductive contacting piece 128b at this time comes in contact with the conductive pattern 127 and becomes ON, thus its switch signal B becomes low, and the output of the AND gate G2 becomes low. Also, the outputs of the NOR gate G3 and the inverter IV3 become high. Therefore, the loading motor 141, the tape take up motor 156 and the tape rewinding motor 158 are stopped at this time, and the recorder 100 is stopped in a state in which the unloading of the tape 104 is completed as shown in FIG. 3(a).

Figure 14B:
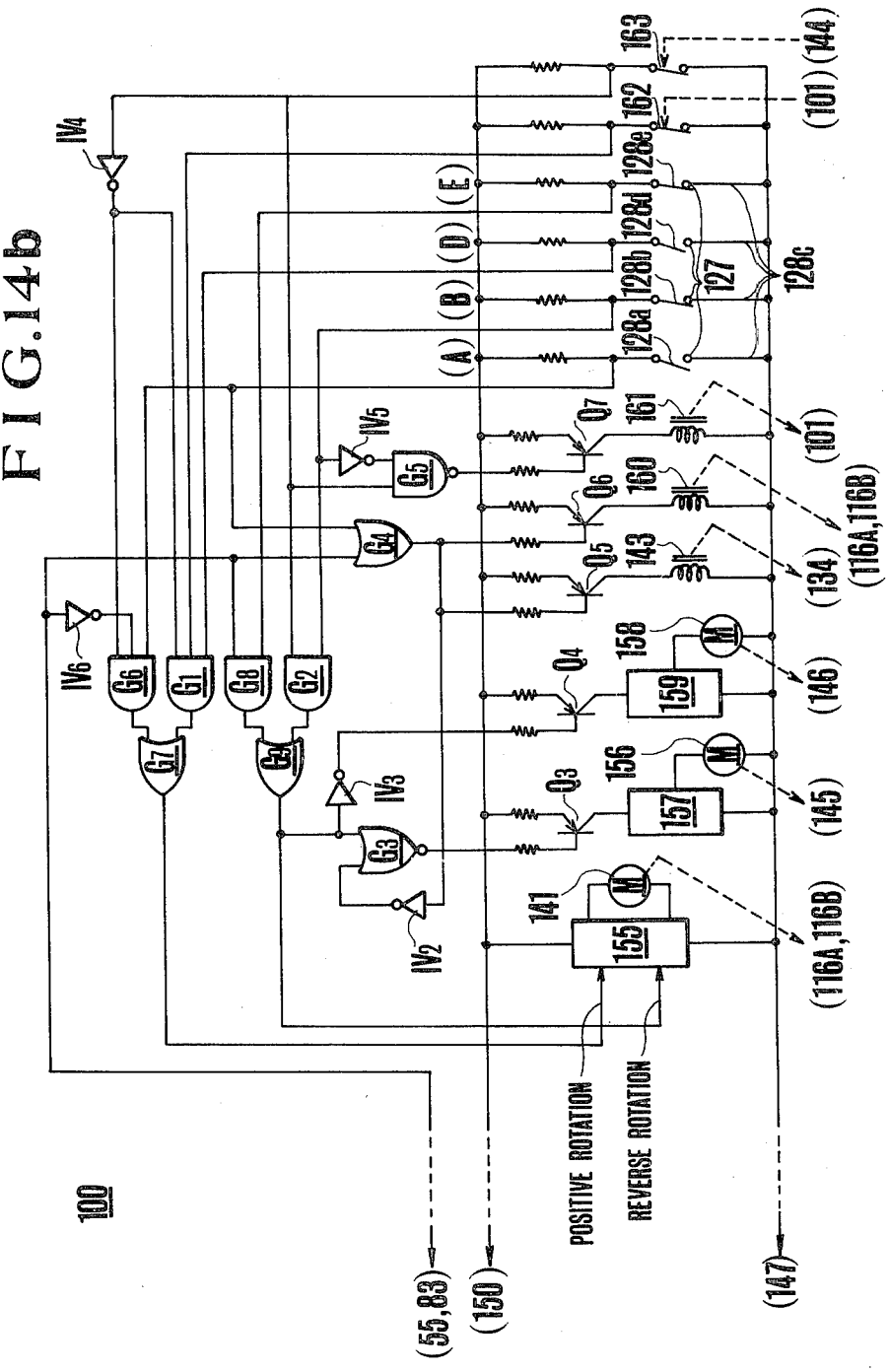
FIG. 14(b) is a circuit connection diagram of important parts to show chiefly an arrangement of circuit systems of important parts of a modification when tape loading is done stepwise at the video recorder side in the modified example explained in FIG. 7.

Next, in a case when the arrangement of the tape pre-loading as described above is applied to the modified example explained in FIG. 7, the circuit system at the recorder 100 side is changed to, for example, that shown in FIG. 14(b). That is, the arrangement shown in FIG. 14(b) is explained by comparing it with the arrangement of the modified example shown in FIG. 14(a). Here, the AND gate G1 for giving the tape pre-loading instruction to the loading motor control circuit 155 is so made as receiving the switch signal D obtained according to ON, OFF of the conductive contacting piece 128d, the signal obtained according to ON, OFF of the cassette loading detection switch 162, and the output signal of the inverter IV4 which inverts the signal obtained according to ON, OFF of the eject switch 163. And the AND gate G6 for giving the tape loading instruction receives the switch signal A obtained according to ON, OFF of the conductive contacting piece 128a and the output signal of the inverter IV6 which inverts the signal obtained according to ON, OFF of the second trigger switch 55 or the second remote switch 83 at the camera 1 side, and receives the output signal of the inverter IV4.

The inputs into the AND gate G2 are the same as those in the arrangement shown in FIG. 7. And connections for inputs and outputs for the OR gates G4, G7 and G9, the AND gate G8, the NOR gate G3, and the inverters IV2 and IV3 are the same as those in the arrangement shown in FIG. 14(a). Other than the above, the arrangements are the same as those in FIG. 7.

And in such arrangement as mentioned above, when the tape cassette 101 is loaded into the cassette loading chamber of the recorder 100, the cassette loading detection switch 162 becomes OFF. Therefore, first the output of the AND gate G1 becomes high, and the loading motor 141 is rotated to its normal direction through the loading motor control circuit 155, so that the tape 104 is shifted from the unloading state to the above-mentioned pre-loading state. Then, as the loading arms 116A and 116B reach the above-mentioned pre-loading positions, the conductive contacting piece 128d at this time becomes ON. Thus, the output of the AND gate G1 becomes low, the loading motor 141 is stopped, and the tape 104 will be set in the pre-loading state shown in FIG. 12. Afterward, when the second trigger switch 55 or the second remote switch 83 at the camera 1 side is put in, the output of the AND gate G6 becomes high. Therefore, the loading motor 141 is again rotated to the normal direction and the tape 104 is shifted from the pre-loading state to the loading state. As the loading of the tape 104 is completed, the loading arms 116A and 116B are latched at the loading positions in a manner similar to the case of the modified example shown in FIG. 14(a). At the same time, the pinch roller 134 is made to have a pressure contact with the capstan 130, the tape take up motor is activated and thus a recording is started.

When the second trigger switch 55 or the second remote switch 83 at the camera side 1 is made OFF for the purpose of terminating the recording, the outputs of the AND gate G8 and the OR gate G4 become high. Therefore, the pinch roller 134 is made to be separated from the capstan 130 in the same manner as that in the case of the modified example shown in FIG. 14(a), and the latching of the modified example shown in FIG. 14(a), and the latching of the loading arms 116A and 116B is released. Also, the loading motor 141 is made to make reverse rotations, and at the same time the tape rewinding motor 158 is activated while the operation of the tape take up motor 156 is maintained. Therefore, the tape 104 is shifted from the loading state to the pre-loading state. And as the loading arms 116A and 116B reach the pre-loading positions shown in FIG. 12, the output of the AND gate G8 at this time becomes low, therefore the loading motor 141, the tape take up motor 156 and the tape rewinding motor 158 are stopped, so that the tape 104 will be set in the pre-loading state shown in FIG. 12.

Later, when the eject button 144 is operated to make the eject switch 163 OFF for the purpose of taking out the cassette 101, the output of the AND gate G2 becomes high. Therefore, the loading motor 141 is made to rotate to the reverse direction again, the tape take up motor 156 and the tape rewinding motor 158 are activated, and the tape 104 is shifted from the pre-loading state to the unloading state. As the loading arms 116A and 116B reach the unloading positions and the tape unloading is completed, the conductive contacting piece 128b at this time becomes ON, and by this the output of the AND gate G2 becomes low. Therefore, the loading motor 141, the tape take up motor 156 and the tape rewinding motor 158 are stopped. Further, the output of the NAND gate G5 becomes low as the conductive contacting piece 128b at this time becomes ON, so that power is supplied to the transistor Q7, and thus power is supplied to the ejecting solenoid 161. Therefore, the tape cassette 101 is ejected from the cassette loading chamber of the recorder 100.

Now, some explanation shall be made on combination arrangements of the various examples and modified examples explained above. For example, the modified example on the tape loading of the recorder 100 explained in FIG. 7 and FIG. 14(b) may be combined with the example of the camera 1 explained in FIGS. 9 and 10. Also, the modified example of the video camera 1 relating to the stepwise exciting heater circuit 17 of the image pick up tube 14, and of the heater circuit 20 of the image projection tube 18 explained in FIGS. 11(a) and 11(b), could be applied to the video camera 1 in the system of the example explained in FIGS. 1 to 6. That is, in the latter case, the transistor Q9 may be omitted from the arrangement shown in FIGS. 11(a) and 11(b), and the heater circuit 17 of the image pick up tube 14 and the heater circuit 20 of the image projection tube 18 are both excited in a preparatory manner in the state that the camera 1 is connected to the recorder 100 and the power source switch 150 at the recorder 100 side is actuated. Then, as the first trigger switch 54 at the camera 1 side is actuated, the transistor Q10 conducts and both terminals of the resistance R2 are short-circuited. Therefore, said heaters are completely excited. This helps to reduce the power loss at the camera 1 side.

Also, the arrangement of the remote controller 80 explained in FIGS. 9 and 10 can naturally be applied to the camera 1 in the system of the example explained in FIGS. 1 to 6.

As has been explained above in detail, in a video recording system of the present invention, including first and second switches provided at the camera side for video recording in such a manner to be operated in turn, first, the first switch is operated to start an image pick up action of the camera and at the same time a recorder is set in a recording stand-by state, and then a recording action of the recorder is started by operating the second switch. Therefore, first, unnecessary power loss in both the camera and the recorder can be greatly reduced compared to conventional type systems. Second, the length of time during which the image transcription reproducing magnetic heads, which are in a rotating state, are placed in a circumferentially contacting state with a stationary tape can be remarkably shortened compared to conventional systems and, therefore, the disadvantages of abrasion, damage of magnetized plane of the tape or abrasion of the heads, etc., may be appreciably reduced. Third, operations of the recorder can be controlled only by operating the first and second switches provided at the camera side. Therefore, operating characteristics in video recording can be greatly improved, and very useful advantages can be obtained by the present invention.

Furthermore, a third switch arranged necessarily to be operated before the first and second switches for video recording is provided at the camera side, and the camera is set in a state preparatory for an image pick up, or a stand-by state for image pick up, by operating the third switch, thereby further reducing unnecessary power loss at the camera side. Thus, the invention is quite advantageous in the sense of power saving in a total system.

Figure 15A:
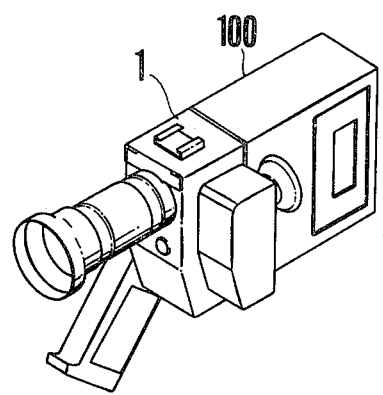
FIGS. 15(a) and (b) are oblique diagrams to show a video recorder and a video camera which constitute a video recording system according to the present invention and are detachably combined, and the same which are integrally formed.
Figure 15B:
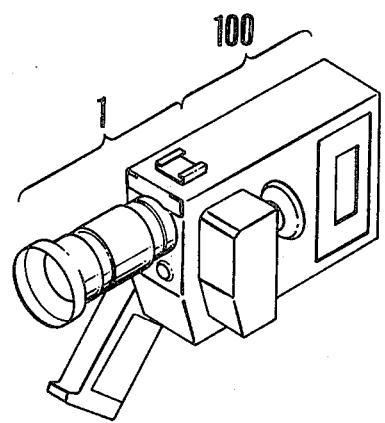

FIGS. 15(a) and 15(b) show a video recorder and a video camera which constitute a video recording system according to the present invention, respectively, and are so made that the camera and the recorder are either detachably coupled or they are formed integrally. In the drawings, what is shown as 1 is a video camera portion and 100 is a video recorder portion. As is apparent from the drawings, the present invention can be applied both to the system in which a camera and a recorder are detachably coupled and to the system in which they are integrally formed, without impairing the effectiveness and advantages of the invention, yet allowing operating characteristics in handling to be further improved.

What is claimed is:

1. A video recording system comprising a video camera including image pick up means for forming an image of an object to be recorded and providing corresponding video signals; a video recorder including recording means for recording the video signals on a tape; and coupling means for operatively connecting said video camera to said video recorder including a selected one of a cable and means for detachably mounting said video camera on said video recorder; wherein said camera is provided with first and second switches arranged to be operated in sequence for controlling an operating state of said recorder and said camera so that when said first switch is actuated, said image pick up means starts to operate and said recording means is set in a partly operative stand-by state, and then when said second switch is actuated, said recording means is fully operative to start a recording operation.

2. A video recording system according to claim 1, in which said image pick up means comprising image pick up tube provided at said camera, said image pick up tube including a heater circuit, and said camera further comprises means for exciting at least said heater circuit by connecting said camera to said recorder, and means for exciting circuits in said camera other than said heater circuit to start operation of said image pick up means by operating said first switch.

3. A video recording system according to claim 1 or claim 2, comprising image projection monitoring means including an image projection tube provided at the camera for displaying the object image, said image projection tube including a heater circuit, and said camera further comprises means for exciting at least said heater circuit by connecting said camera to said recorder, and means for starting operation of said image pick up means as circuits in said camera other than said heater circuit are excited by operating said first switch.

4. A video recording system according to claim 1, wherein said image pick up means comprises a solid state image pick up element arranged at said camera so that an image pick up operation is started as said solid state image pick up element is excited together with camera circuits other than said solid state image pick up element by operating said first switch.

5. A video recording system according to claim 1 or claim 4, comprising image projection monitoring means including a solid state image projection element provided at said camera for displaying the object image, and said solid state image projection element is excited together with camera circuits other than said solid state image pick up element by operating said first switch for starting an image pick up operation.

6. A video recording system according to claim 1, in which said image pick up means comprises an image pick up tube provided at said camera, said image pick up tube including a heater circuit, and said camera further comprises means for partially exciting at least said heater circuit by connecting said camera to said recorder, so that said heater circuit of said image pick up tube is completely excited together with camera circuits other than said heater circuit by operating said first switch for starting an image pick up operation.

7. A video recording system according to claim 1 or claim 6, comprising image projection monitoring means including an image projection tube provided at said camera for displaying the object image, said image projection tube including a heater circuit, and said camera further comprises means for partially exciting at least said heater circuit by connecting said camera to said recording, so that said heater circuit of said image projection tube is completely excited together with camera circuits other than said heater circuit by operating said first switch for starting an image pick up operation.

8. A video recording system according to claim 1, in which said recording means includes tape running means for moving a tape in operative relation with said recording means, and said tape running means is arranged to be actuated by operating said second switch for starting a recording operation by said recording means after operating said first switch.

9. A video recording system according to claim 8, in which said recorder includes means responsive to said first switch for loading a tape substantially housed in a tape cassette onto a part of said recording means after the cassette is loaded into said recorder.

10. A video recording system according to claim 8, in which said recorder includes means for detecting loading of a tape cassette into said recorder, and means responsive to said detecting means for loading a tape substantially housed in the tape cassette onto a part of said recording means.

11. A video recording system according to claim 8, in which said recording means includes tape positioning means for withdrawing a tape substantially housed in a tape cassette loaded into said recorder from the cassette and positioning the tape in a preloading state wherein the tape is so positioned as to be almost operatively loaded onto but out of contact with a part of said recording means by operating said first switch, and the tape is then loaded onto said recording means by operating said second switch.

12. A video recording system according to claim 8, in which said recording means includes means for detecting loading of a tape cassette into said recorder, and tape positioning means responsive to said detecting means for withdrawing a tape substantially housed in a tape cassette loaded into said recorder from the tape cassette and for simultaneously positioning the tape in a pre-loading state wherein the tape is so positioned as to be almost operatively loaded onto but out of contact with a part of said recording means wherein the tape is then loaded onto said recording means by operating said second switch.

13. A video recording system according to claim 11 or claim 12, including means for actuating said tape running means when the loading of the tape onto said recording means is completed.

14. A video recording system according to claim 1, including a camera trigger member, and said first and second switches are arranged to be operated in sequence by said camera trigger member.

15. A video recording system comprising a video camera including image pick up means for forming an image of an object to be recorded and providing corresponding video signals, a video recorder including recording means for recording the video signals on a tape, wherein said camera is provided with first and second switches arranged to be operated in sequence for initiating a video recording operation, and a third switch provided at said camera so as to be operated initially before said first and second switches when a video recording operation is to be performed so that said camera is set in a selected one of an image pick up preparatory state or in an image pick up stand-by state wherein said image pick up means is only partially operative by operating said third switch, said image pick up means becomes fully operative and at the same time said recording means is set in a recording stand-by state wherein said recording means is only partially operative by operating said first switch, and afterward, a recording operation by said recording means is started by operating said second switch.

16. A video recording system according to claim 15, in which said image pick up means comprises an image pick up tube provided at said camera, said image pick up tube including a heater circuit, and said camera further comprises means for exciting at least said heater circuit by operating said third switch, and means for exciting circuits in said camera other than said heater circuit to start operation of said image pick up means by operating said first switch.

17. A video recording system according to claim 15 or claim 16, comprising image projection monitoring means including an image projection tube provided in said camera for displaying the object image, said image projection tube including a heater circuit, means for exciting at least said heater circuit by operating said third switch, and means for exciting circuits in said camera other than said heater circuit by operating said first switch for starting an operation of said image pick up means.

18. A video recording system according to claim 15, in which said image pick up means comprises an image pick up tube provided at said camera, said image pick up tube including a heater circuit, means for partially exciting at least said heater circuit by operating said third switch, and means for completely exciting said heater circuit of said image pick up tube together with camera circuits other than said heater circuit by operating said first switch for starting image pick up operation.

19. A video recording system according to claim 15 or claim 18, comprising image projection monitoring means including an image projection tube provided as said camera for displaying the object image, said image projection tube including a heater circuit, and means for partially exciting at least said heater circuit by operating said third switch, so that said heater circuit of said image projection tube is completely excited together with camera circuits other than said heater circuit by operating said first switch for starting an image pick up operation.

20. A video recording system according to claim 15, in which said recording means in said recorder includes tape running means for moving a tape in operative relation with said recording means, and said tape running means is arranged to be actuated by operating said second switch for starting a recording operation by said recording means after operating said first switch.

21. A video recording system according to claim 20, in which said recorder includes means for loading a tape substantially housed in a tape cassette onto a part of said recording means after the cassette is loaded into said recorder by operating said first switch.

22. A video recording system according to claim 20, in which said recorder includes means for detecting loading of a tape cassette into said recorder, and means responsive to said detecting means for loading a tape substantially housed in the tape cassette onto a part of said recording means.

23. A video recording system according to claim 20, in which said recording means includes tape positioning means for withdrawing a tape substantially housed in a tape cassette loaded into said recorder from the cassette and positioning the tape in a pre-loading state wherein the tape is so positioned as to be almost operatively loaded onto but out of contact with a part of said recording means in said recorder by operating said first switch, and the tape is then loaded onto said recording means by operating said second switch.

24. A video recording system according to claim 20, in which said recording means includes menas for detecting loading of a tape cassette into said recorder, and tape positioning means responsive to said detecting means for withdrawing a tape substantially housed in a tape cassette from the tape cassette and for positioning the tape in a pre-loading state wherein the tape is so positioned as to be almost operatively loaded onto but out of contact with a part of said recording means wherein the tape is then loaded onto said recording means by operating said second switch.

25. A video recording system according to claim 20, in which said recording means is arranged to be set in a partially operative recording preparatory state by operating said third switch.

26. A video recording system according to claim 25, in which said recorder includes means for loading a tape substantially housed in a tape cassette onto a part of said recording means after the cassette is housed in said recorder by operating said third switch.

27. A video recording system according to claim 25, in which said recording means includes tape positioning means for withdrawing a tape substantially housed in a tape cassette loaded into said recorder from the cassette and positioning the tape in a pre-loading state wherein the tape is so positioned as to be almost operatively loaded onto but out of contact with a part of said recording means in said recorder by operating said third switch, so that the tape is then loaded onto said recording means by operating said second switch.

28. A video recording system according to any one of claim 23, claim 24 and claim 27, in which said tape running means is arranged to be actuated when the tape is completely loaded onto said recording means.

29. A video recording system according to claim 15, including a camera trigger member, and said first and second switches are arranged to be operated in sequence by said camera trigger member.

30. A video recording system according to claim 29, including a hand grip arranged on said camera, and said third switch is arranged to be operated by grasping said grip.

31. A video recording system according to claim 29, including a hand grip arranged on said camera for movement between an erect and a flattened position, and said third switch is arranged to be operated by moving said grip to said flattened position.

32. A video recording system according to any one of claims 29 to 31, in which said third switch is arranged to be operated by a part of a tripod when the tripod is attached to said camera.

33. A video recording apparatus comprising:
image pick up means for forming an image of an object to be recorded and providing corresponding video signals;
recording means for recording the video signal on a tape;
tape running means for moving said tape in operative relation with said recording means;
tape loading means for loading said tape substantially housed in a tape cassette onto a part of said recording means;
a casing for containing the pick up means, recording means, tape running means and tape loading means; and
first and second switches, the image pick up means and the tape loading means becoming operative with the operation of the first switch, and the video signals being recorded on the tape by the recording means with the operation of the second switch.

34. A video recording apparatus according to claim 33, wherein the tape loading means has free-load means for placing the tape at a drawn position from the tape cassette without contacting a part of the recording means, said free-load means being operated by the first switch, and said tape being loaded in the recording means by the second switch.

35. A video recording apparatus according to claim 33, wherein the image pick up means is a solid image pick up element.

36. A video recording apparatus according to claim 33, wherein the first and second switches are operated by the same trigger member.

37. A video recording apparatus according to claim 36, wherein the trigger member is a push in member which is put in the casing, and the first switch is operated when the push in member is put in a predetermined amount and the second switch is operated when the push in member is put in beyond the predetermined amount.

38. A video recording apparatus according to claim 33, wherein the tape running means is made operative by the operation of the second switch.

39. A video recording apparatus according to claim 34, wherein the tape running means is made operative after the tape is loaded in the recording means.

* * * * *